United States Patent [19]
Hamaguchi et al.

[11] Patent Number: 5,717,484
[45] Date of Patent: Feb. 10, 1998

[54] POSITION DETECTING SYSTEM

[75] Inventors: Takayuki Hamaguchi, Takarazuka; Nobukazu Kawagoe, Osaka, both of Japan

[73] Assignee: Minolta Co., Ltd., Osaka, Japan

[21] Appl. No.: 405,781

[22] Filed: Mar. 17, 1995

[30] Foreign Application Priority Data

Mar. 22, 1994 [JP] Japan ................................. 6-050575
Feb. 2, 1995 [JP] Japan ................................. 7-015750

[51] Int. Cl.$^6$ ................................. G01C 3/00; G01C 5/00; H01J 40/14
[52] U.S. Cl. ................................. 356/3.12; 250/214 B; 356/3.01; 356/3.09; 356/3.1
[58] Field of Search ................................. 356/3.01, 3.1, 356/3.09, 3.12; 250/214 B

[56] References Cited

U.S. PATENT DOCUMENTS

| | | |
|---|---|---|
| 2,830,487 | 4/1958 | Griffith . |
| 4,328,545 | 5/1982 | Halsall et al. . |
| 4,688,933 | 8/1987 | Lapeyre . |
| 4,910,464 | 3/1990 | Trett et al. . |
| 5,039,217 | 8/1991 | Maekawa et al. . |

*Primary Examiner*—Stephen C. Buczinski
*Attorney, Agent, or Firm*—Burns, Doane, Swecker & Mathis, LLP

[57] ABSTRACT

A first light receiving portion and a second light receiving portion are provided on the upper surface of a moving body having driving wheels at an interval of a prescribed distance in a plane. The first light receiving portion and the second light receiving portion rotate around the axis in the vertical direction. On the other hand, a first light emitting portion and a second light emitting portion are provided on the side face of a station serving as a reference station at an interval of a prescribed distance in a plane. The first and second light receiving portions carry out sampling while rotating, so that the quantity of light reception is changed according to the directivities of the first and second light receiving portions. When the peaks of the directivities of the first and second light receiving portions match the direction of the first light emitting portion or the second light emitting portion, the quantity of light reception is maximized. Based on a rotational angle at which the quantity of light reception is maximized, the relative positions and the relative directions of the first and second light receiving portions with respect to the first and second light emitting portions are calculated.

27 Claims, 20 Drawing Sheets

POSITION DETECTING SYSTEM

BACKGROUND OF THE INVENTION

1. Field of the Invention

The present invention generally relates to position detecting systems, and more particularly, to a position detecting system incorporated into an autonomous traveling vehicle, a locomotive robot, or the like.

2. Description of the Related Art

An autonomous traveling vehicle or robot introduced in a factory or the like autonomously travels with reference to map information input in advance and information from various sensors such as a distance sensor, an obstacle sensor, a gyrosensor and the like obtained during traveling. However, when there is an obstacle which is not included in the map information at the time of autonomous traveling, the vehicle or robot can avoid the obstacle in some cases, and cannot avoid the obstacle in other cases. There is no technique proposed for coping with the case where position information is confused by slip or the like caused by a collision or the like, and the route is lost.

At the time of an emergency stop caused by an obstacle or the like, such a conventional autonomous traveling vehicle or robot as described above must be returned to the route or to the starting position manually. Such an autonomous traveling vehicle or robot often bothers the operator.

SUMMARY OF THE INVENTION

One object of the present invention is to grasp the relative position between two objects autonomously in a position detecting system.

Another object of the present invention is to calculate the relative position between two objects precisely in a position detecting system.

Still another object of the present invention is to increase a degree of freedom in a system design in a position detecting system.

A further object of the present invention is to eliminate the influence of light of a fluorescent lamp in a position detecting system.

In order to achieve the above objects, a position detecting system according to the present invention, for detecting the relative position between a first object and a second object, includes two signal emitters provided on the first object and separated from each other, two signal receivers provided on the second object different from the first object, separated from each other, and each receiving signals emitted from the signal emitters, and a calculator calculating the relative position based on outputs of the signal receivers.

The position detecting system structured as described above calculates the relative position between the first object and the second object based on outputs from two signal receivers receiving the signals emitted from the two signal emitters.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
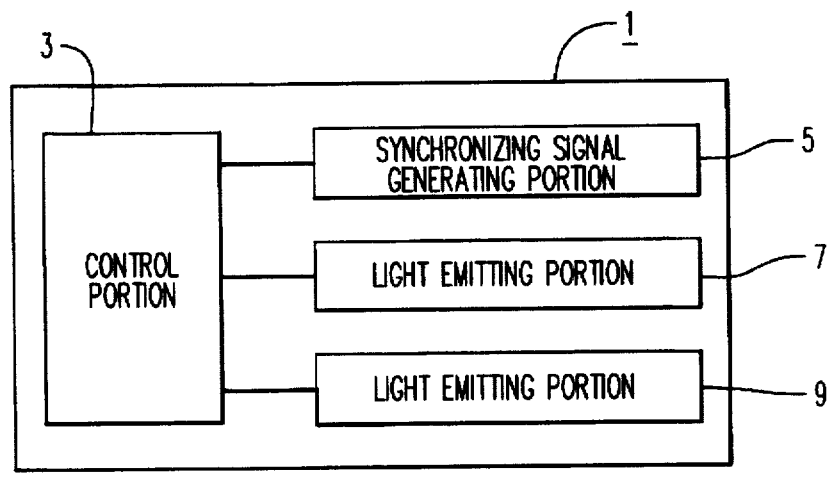
FIG. 1 is a block diagram showing a structure of a light emitting unit according to a first embodiment of the present invention.

FIG. 1 is a block diagram showing a structure of a light emitting unit according to the first embodiment of the present invention.

Referring to FIG. 1, a light emitting unit 1 includes a control portion 3 configured with a CPU at its center, and a synchronizing signal generating portion 5, a first light emitting portion 7 including a light emitting diode, and a second light emitting portion 9 including a light emitting diode, all connected to control portion 3. First light emitting portion 7 and second light emitting portion 9 are controlled by control portion 3 to emit light in synchronism with a signal generated by synchronizing signal generating portion 5. It is preferable that the directivity of light emitting portion 9 (7) is wide in order to emit light in as wide a range as possible. Therefore, in this embodiment, a light emitting portion having a directivity of 180° is used.

Figure 2:
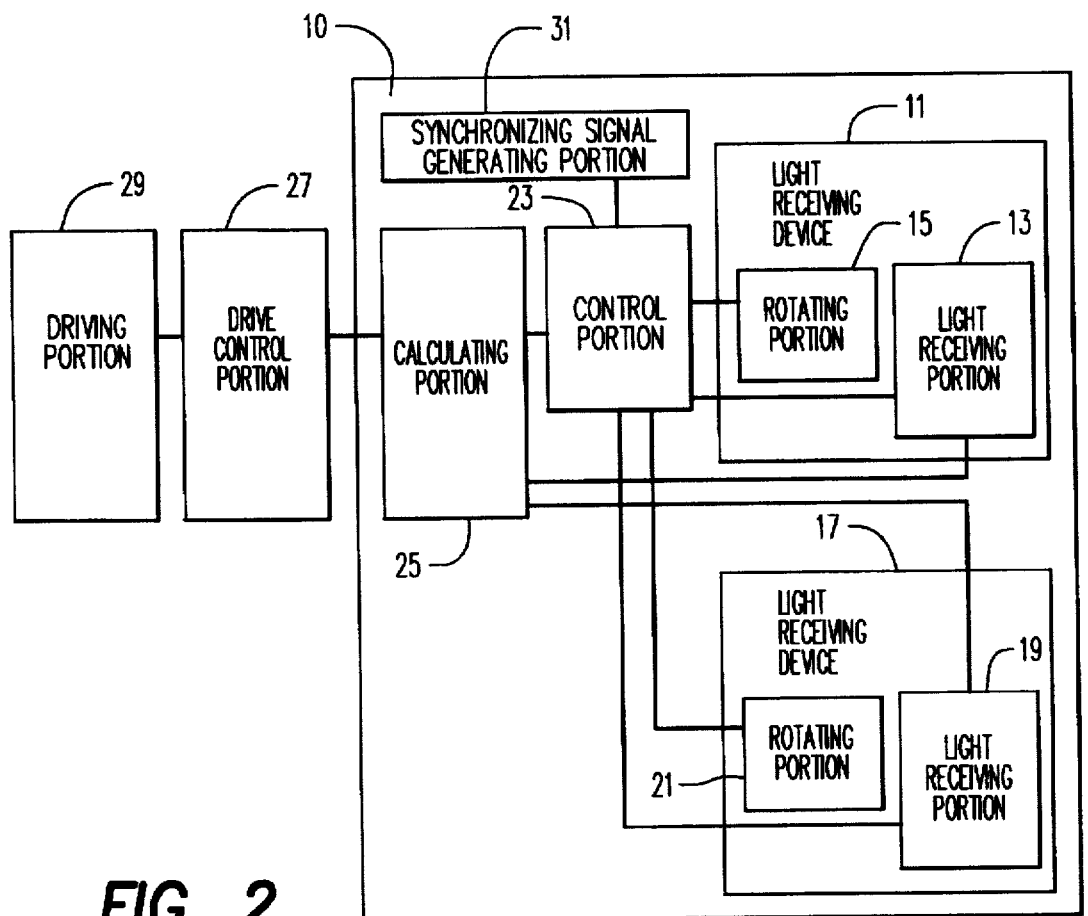
FIG. 2 is a block diagram showing a structure of a light receiving unit according to the first embodiment of the present invention.

FIG. 2 is a block diagram showing a structure of a light receiving unit attached to a moving body according to the first embodiment of the present invention.

Referring to FIG. 2, a light receiving unit 10 is structured with a control unit 23 including a CPU as its center. To control portion 23, connected are a light receiving portion 13 including a photodiode, and a rotating portion 15 rotating light receiving portion 13 for changing the light receiving direction of light receiving portion 13, which configure a first light receiving device 11. To control portion 23, further connected are a light receiving portion 19 including a photodiode, and a rotating portion 21 rotating light receiving portion 19, which configure a second light receiving device 17 spaced by a prescribed distance in a plane from first light receiving device 11. A synchronizing signal generating portion 31 for generating a synchronizing signal synchronizing light receiving timings of light receiving portions 13 and 19, and a calculating portion 25 for performing a prescribed calculation based on quantities of light reception obtained from light receiving portions 13 and 19 are also connected to control portion 23. Further, a drive control portion 27 controlling a driving portion 29 of the moving body based on the result of calculating portion 25 is connected to calculating portion 25. In this embodiment, light receiving portion 19 (13) having a directivity of ±10° is used. However, a light receiving portion having a narrower directivity may be used, thereby increasing the detection precision.

Figure 3:
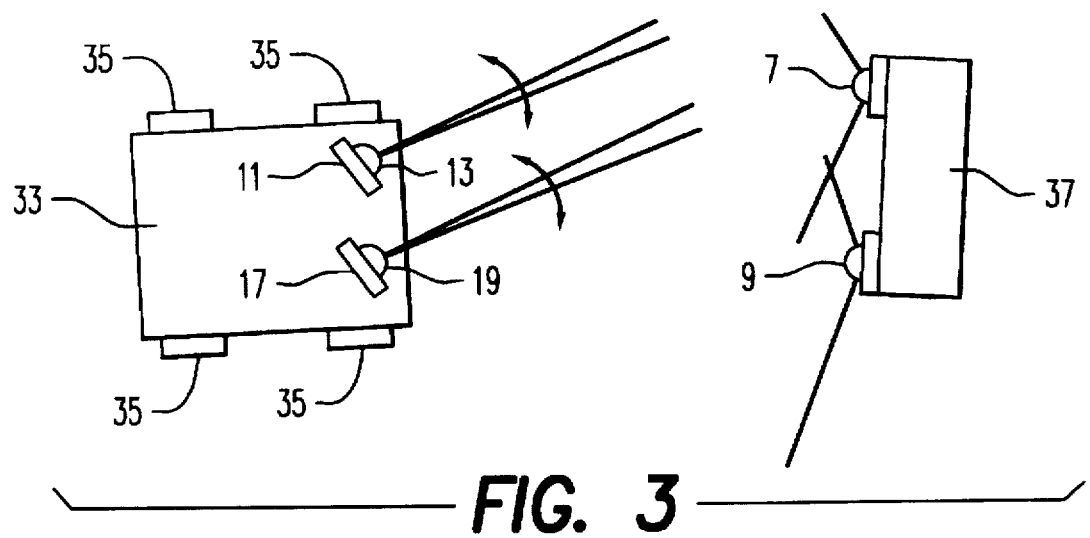
FIG. 3 is a plan view showing the positional relationship between a moving body and a station according to the first embodiment of the present invention.

FIG. 3 is a plan view showing a state where the light emitting unit and the light receiving unit shown in FIGS. 1 and 2 are incorporated in a station serving as a reference station and a moving body, according to the first embodiment of the present invention.

Referring to FIG. 3, light receiving portion 13 and light receiving portion 19 are provided on the upper surface of a moving body 33 which is a first object or a second object including driving wheels 35 separately from each other by a prescribed distance, and rotate with the direction penetrating the sheet of paper in the figure as a rotating axis.

On the other hand, first light emitting portion 7 and second light emitting portion 9 are spaced from each other in a plane on the side surface of a station 37 serving as a reference station which is the first object. Light receiving portion 13 and light receiving portion 19 rotate in order to receive light emitted from first light emitting portion 7 and second light emitting portion 9. With the rotation, the quantity of light reception changes according to the directivity of the light receiving portion. When the peak of the directivity of the light receiving portion matches the direction of the light emitting portion, the quantity of light reception is maximized.

Figure 4:
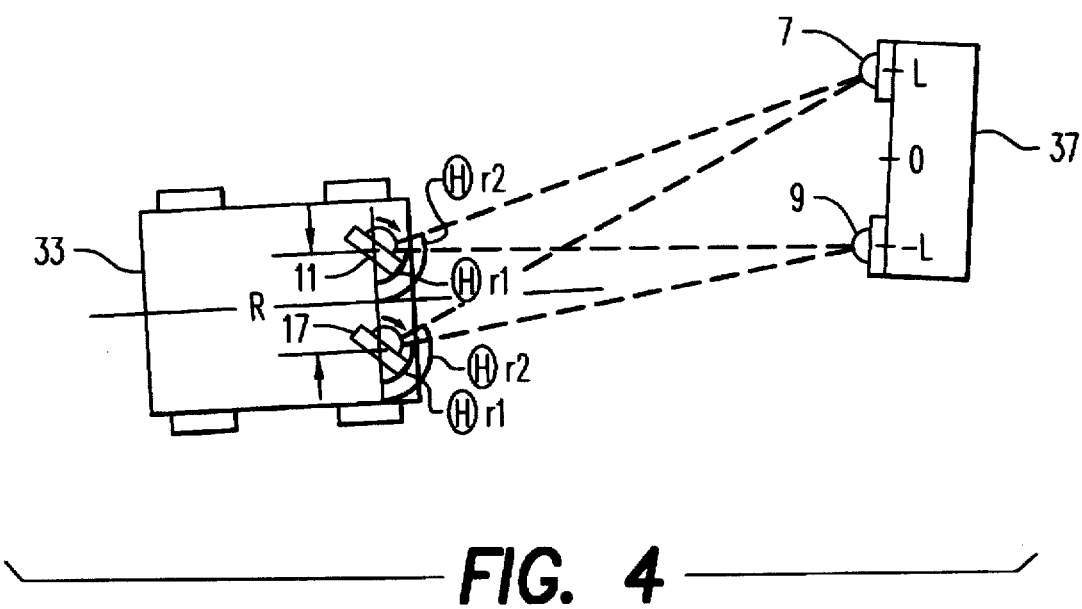
FIG. 4 is a diagram, corresponding to FIG. 3, showing the relationship of azimuth of each of light receiving portions with respect to each of light emitting portions.
Figure 5:
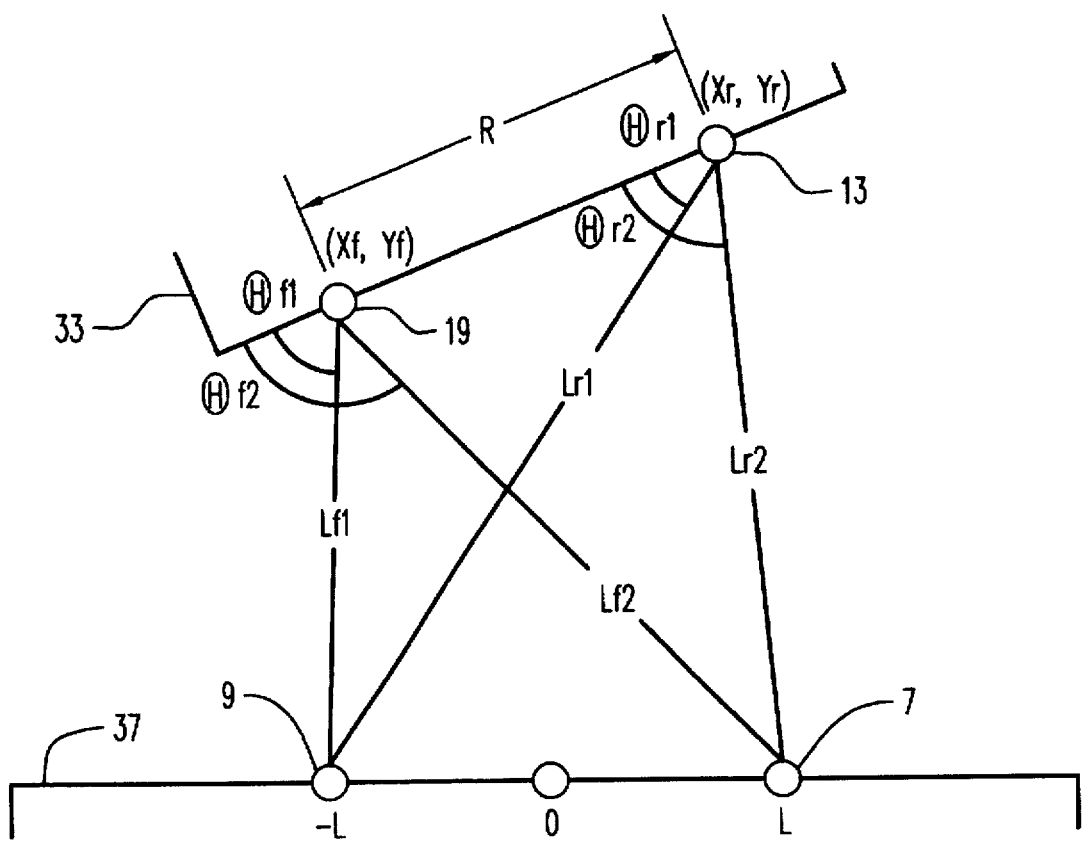
FIG. 5 is a diagram, corresponding to FIG. 4, showing an absolute coordinate or the like of each of the light receiving portions with respect to the origin in the station.

FIG. 4 is a diagram showing the relationship of azimuths of the light receiving portions with respect to the light emitting portions in the relation between moving body 33 and station 37 shown in FIG. 3. FIG. 5 is a diagram showing the mutual positional relationship between respective light receiving portions and respective light emitting portions by extraction from FIG. 4.

Referring to the figures, light emitting portion 7 and light emitting portion 9 are attached at the positions of length L and length −L around the origin 0 of station 37. On the other hand, light receiving portion 13 and light receiving portion 19 in moving body 33 are spaced from each other by a prescribed distance R in a plane. The straight-line distances of light receiving portion 13 from light emitting portion 7 and light emitting portion 9 are Lr2 and Lr1, respectively, and the azimuths are Θr2 and Θr1, respectively.

On the other hand, the straight-line distances of light receiving portion 19 from light emitting portion 7 and light emitting portion 9 are Lf2 and Lf1, respectively, and the azimuths are Θf2 and Θf1. The absolute coordinates of light receiving portion 13 and light receiving portion 19 around the origin 0 are (Xr, Yr) and (Xf, Yf). More specifically, (Xf, Yf) and (Xr, Yr) are the absolute coordinates around the starting position (origin 0) of station 37, based on which the relative position and the relative direction between the moving body and the station are detected.

Note that the azimuth of each of the light receiving portions is detected based on the rotation angle of the light receiving portion when the quantity of light reception takes the maximum value. Based on the detected azimuth, the straight-line distances of light receiving portions 13 and 19 from light emitting portions 7 and 9 and the absolute coordinates thereof around the origin 0 are found according to the following expressions:

$$Lf1 = R\frac{\cos\Theta r1 \sqrt{(\cos^2\Theta f1 - 1)(\cos^2\Theta r1 - 1)} \pm (\cos^2\Theta r1 - 1)\cos\Theta f1}{\cos^2\Theta f1 - \cos^2\Theta r1}$$

$$Lr1 = R\frac{\cos\Theta f1 \sqrt{(\cos^2\Theta f1 - 1)(\cos^2\Theta r1 - 1)} \pm (\cos^2\Theta f1 - 1)\cos\Theta r1}{\cos^2\Theta f1 - \cos^2\Theta r1}$$

$$Lf2 = R\frac{\cos\Theta r2 \sqrt{(\cos^2\Theta f2 - 1)(\cos^2\Theta r2 - 1)} \pm (\cos^2\Theta r2 - 1)\cos\Theta f2}{\cos^2\Theta f2 - \cos^2\Theta r2}$$

$$Lr2 = R\frac{\cos\Theta f2 \sqrt{(\cos^2\Theta f2 - 1)(\cos^2\Theta r2 - 1)} \pm (\cos^2\Theta f2 - 1)\cos\Theta r2}{\cos^2\Theta f2 - \cos^2\Theta r2}$$

$$Xf = \frac{Lf1^2 - Lf2^2}{4L}$$

$$Yf = \frac{\sqrt{-16L^2 + 8Lf1^2 - \frac{Lf1^4}{L^2} + 8Lf2^2 + \frac{2Lf1^2Lf2^2}{L^2} - \frac{Lf2^4}{L^2}}}{4}$$

$$Xr = \frac{Lr1^2 - Lr2^2}{4L}$$

$$Yr = \frac{\sqrt{-16L^2 + 8Lr1^2 - \frac{Lr1^4}{L^2} + 8Lr2^2 + \frac{2Lr1^2Lr2^2}{L^2} - \frac{Lr2^4}{L^2}}}{4}$$

Figure 6:
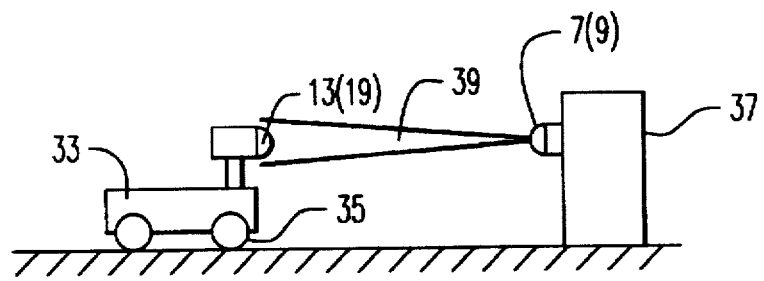
FIG. 6 is a diagram showing an example of the relationship between the moving body and the station seen from the side, according to the first embodiment of the present invention.

FIG. 6 is a diagram showing the relationship between moving body 33 and station 37 in FIG. 3 seen from the side.

Figure 7:
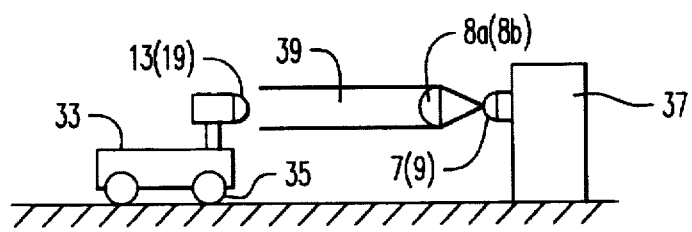
FIG. 7 is a diagram showing another example of the relationship between the moving body and the station seen from the side, according to the first embodiment of the present invention.
Figure 7:
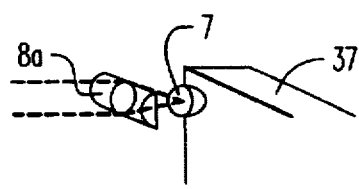

Referring to the figure, light receiving portion 13 (19) provided on moving body 33 receives light emitted from first light emitting portion 7 (second light emitting portion 9) provided on the side face of station 37. Therefore, positioning the light receiving portion and the light emitting portion at an approximately equal horizontal level increases the quantity of light reception and improves the detection precision of the azimuth. As shown at (1) and (2) of FIG. 7, by placing a convex cylindrical lens 8a (8b) in front of the light emitting portion, and by collecting light emitted from light emitting portion 7 (9) in the vertical direction at the height position of the light receiving portion, the quantity of light reception can be increased, and the decision precision of the azimuth can be improved.

Figure 8:
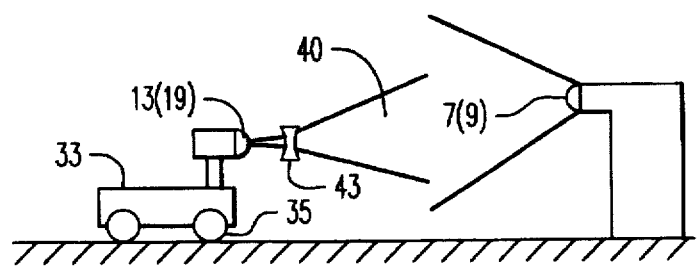
FIG. 8 is a diagram showing the relationship between the moving body and the station seen from the side, according to a second embodiment of the present invention.
Figure 8:
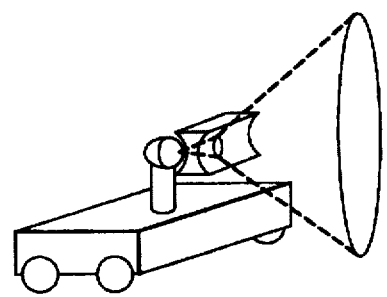

FIG. 8 shows at (1) the relationship between the moving body and the station according to the second embodiment of the present invention, and shows at (2) a perspective view of the moving body.

Referring to the figures, first light emitting portion 7 (second light emitting portion 9) provided on station 37 is positioned higher than light receiving portion 13 (19) at the horizontal level. In this case, if no measures are taken as is the case of the first embodiment shown in FIG. 6, light emitted from first light emitting portion 7 (second light emitting portion 9) is not sufficiently received by light receiving portion 13 (19). The detection precision of the azimuth is decreased. Therefore, in this embodiment, a concave cylindrical lens 43 is provided in front of first light receiving portion 13 (second light receiving portion 19), so that the directivity of the light receiving portion is extended in the vertical direction. As a result, even if the light emitting portion and the light receiving portion are positioned differently in height, the light receiving portion can receive light sufficiently. The light emitting portion and the light receiving portion can be positioned under a decreased restriction upon height. As a result, a degree of freedom in designing a position detecting system is increased, enabling efficient designing. At (1) of FIG. 8, the case is shown where the light emitting portion is positioned higher than the light receiving portion. However, it is needless to say that the similar effects can be expected in the case where the light receiving portion is positioned higher than the light emitting portion.

Figure 9:
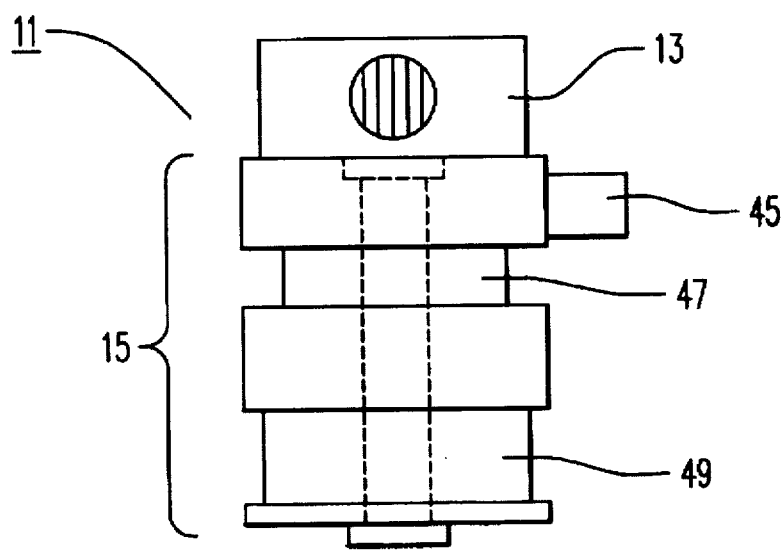
FIG. 9 is a diagram showing a structure of a first light receiving device according to the first embodiment of the present invention.
Figure 10:
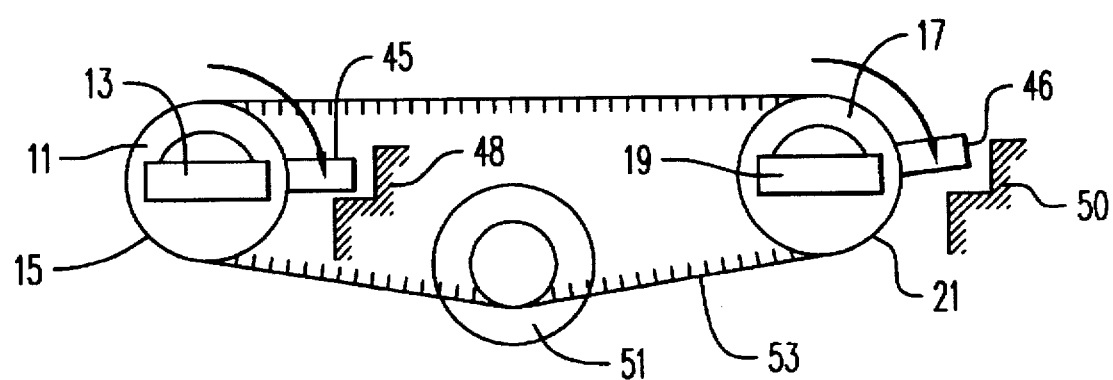
FIG. 10 is a diagram showing a structure for rotating first and second light receiving devices according to the first embodiment of the present invention.

FIG. 9 is a side view showing a structure of first light receiving device 11 shown in FIG. 3. FIG. 10 is a diagram showing a structure of a rotation driving device of first light receiving device 11 and second light receiving device 17 of FIG. 3.

Referring to the figures, first light receiving device 11 includes a torque limiter 47 provided on a pulley 49, and a contacting member 45 provided thereon. Pulley 49, torque limiter 47, and contacting member 45 form a rotating portion 15. Light receiving portion 13 is fixedly mounted on contacting member 45. Note that second light receiving device 17 is structured similar to first light receiving device 11.

The pulley of first light receiving device 11 and the pulley of second light receiving device 17 are bridged by a timing belt 53. Timing belt 53 is driven by a motor 51. By driving motor 51, rotating portion 15 and a rotating portion 21 rotate clockwise through timing belt 53 as shown in FIG. 10. Stoppers 48 and 50 are provided at the positions opposing contacting members 45 and 46. By contacting members 45 and 46 in contact with stoppers 48 and 50, torque limiter 47 operates and driving from the pulleys to rotate contacting members 45 and 46, that is, light receiving portions 13 and 19 is disconnected. Accordingly, the origin can be precisely positioned at the time of rotation of light receiving portions 13 and 19. Note that stoppers 48 and 50 have a position adjustment function for fine adjustment of a stopper position, not shown. Further, motor 51 may be provided for each of light receiving portions 13 and 19.

Figure 11:
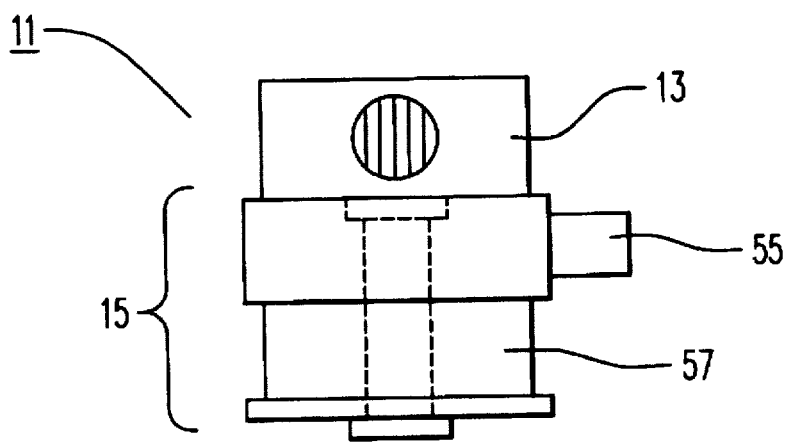
FIG. 11 is a diagram showing a structure of the first light receiving device according to a third embodiment of the present invention.
Figure 12:
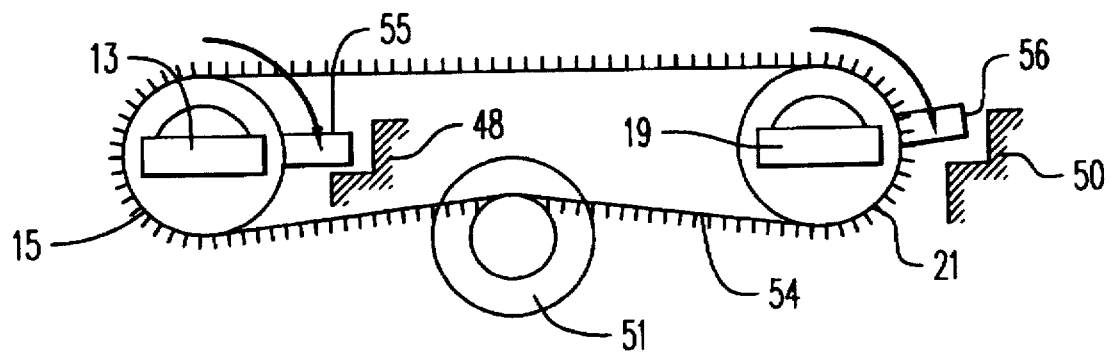
FIG. 12 is a diagram showing a structure for rotating first and second light receiving devices according to the third embodiment of the present invention.

FIGS. 11 and 12 show the third embodiment of the present invention, corresponding to the first embodiment shown in FIGS. 9 and 10, respectively.

Referring to the figures, a contacting member 55 is provided directly on a pulley 57. Contacting member 55 and pulley 57 form rotating portion 15. Light receiving portion 13 is fixedly mounted on rotating portion 15. Second light receiving device 17 is structured similar to first light receiving device 11.

Pulley 57 of first light receiving device 11 and the pulley of second light receiving device 17 are bridged by a timing belt 54. Timing belt 54 is placed with its smooth face in contact with the pulleys and its face with projections towards outside. Motor 51 engages the face with projections of timing belt 54. By driving motor 51, each of first light receiving device 11 and second light receiving device 17 rotates clockwise as shown in the figure. Stoppers 48 and 50 are provided opposing contacting members 55 and 56, respectively. As a result, by contacting members 55 and 56 in contact with stoppers 48 and 50, the smooth face of timing belt 54 operates similar to the torque limiter in the previous embodiment. More specifically, there is a slip between pulley 57 and timing belt 54, causing timing belt 54 to run idly. Accordingly, the origin can be precisely positioned at the time of rotation of light receiving portions 13 and 19. Similar to the above embodiment, a driving motor and a timing belt may be provided for each light receiving device.

Figure 13:
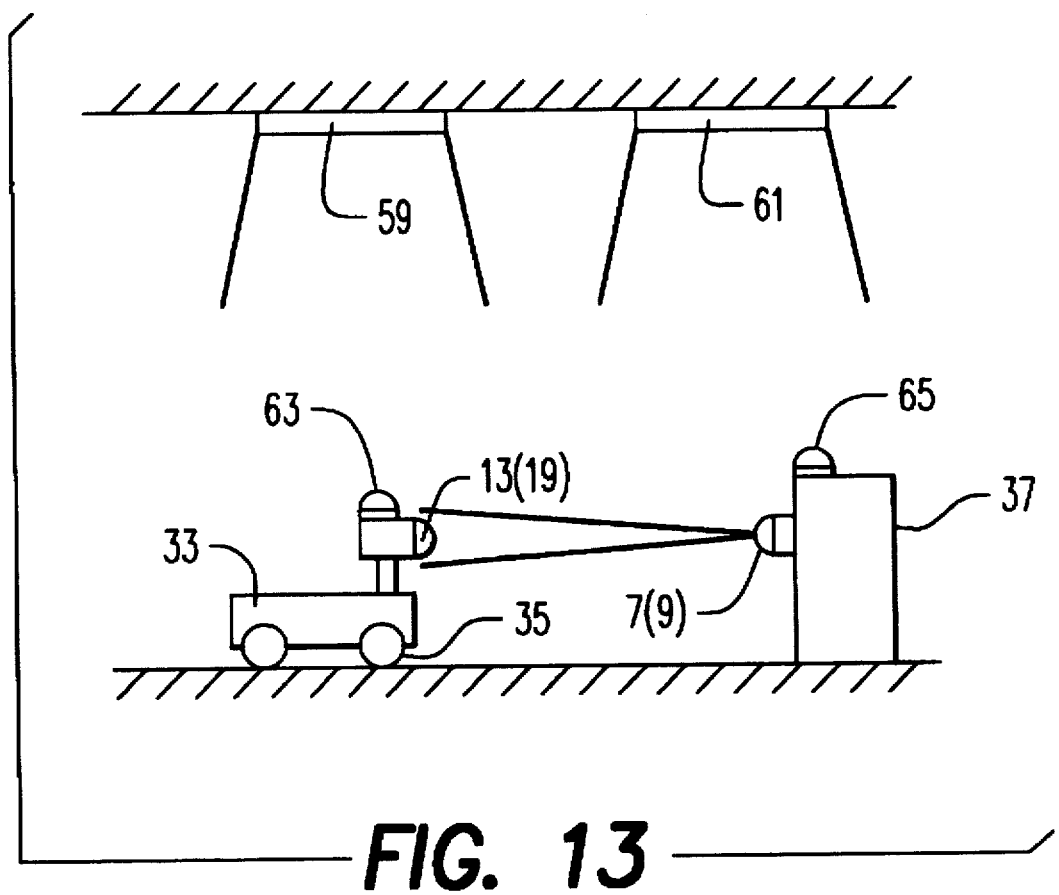
FIG. 13 is a diagram showing the relationship between the moving body and the station seen from the side, when they are used in a house or building where a fluorescent lamp is used for lighting, according to a fourth embodiment of the present invention.

FIG. 13 is a side view showing the positional relationship between the moving body and the station under the circumstances where a fluorescent lamp is on, according to the fourth embodiment of the present invention.

Referring to the figure, when a traveling vehicle or robot is used in a house or building where fluorescent lamps 59 and 61 are used for lighting, light receiving portion 13 (19) of moving body 33 receives not only light emitted from first light emitting portion 7 (second light emitting portion 9), but also light emitted from fluorescent lamps 59 and 61. As a result, there is a possibility that the detection precision of azimuth is reduced by change in the quantity of light of light receiving portion 13 (19). Therefore, in this embodiment, moving body 33 and station 37 are respectively provided with fluorescent lamp light receiving portions 63 and 65 for receiving only light emitted from the fluorescent lamps on their upper surfaces. First light emitting portion 7 (second light emitting portion 9) emits light in synchronism with a frequency ½ of a light emitting frequency of the fluorescent lamp detected by light reception of fluorescent lamp light receiving portion 65. On the other hand, light receiving portion 13 (19) is controlled to receive light in synchronism with a frequency of the fluorescent lamp detected by light reception of fluorescent lamp light receiving portion 63. Accordingly, by finding the difference between two continuous quantities of light reception provided corresponding to the frequency of the fluorescent lamp, the quantity of light received from the fluorescent lamp can be eliminated. As a result, based on the quantity of light reception of light receiving portion 13 (19), the positional relationship can be detected similar to the case where light receiving portion 13 (19) receives only light emitted from first light emitting portion 7 (second light emitting portion 9). As a result, irrespective of irradiation of fluorescent lamps 59 and 61, the positional relationship between moving body 33 and station 37 can be precisely detected.

Figure 14:
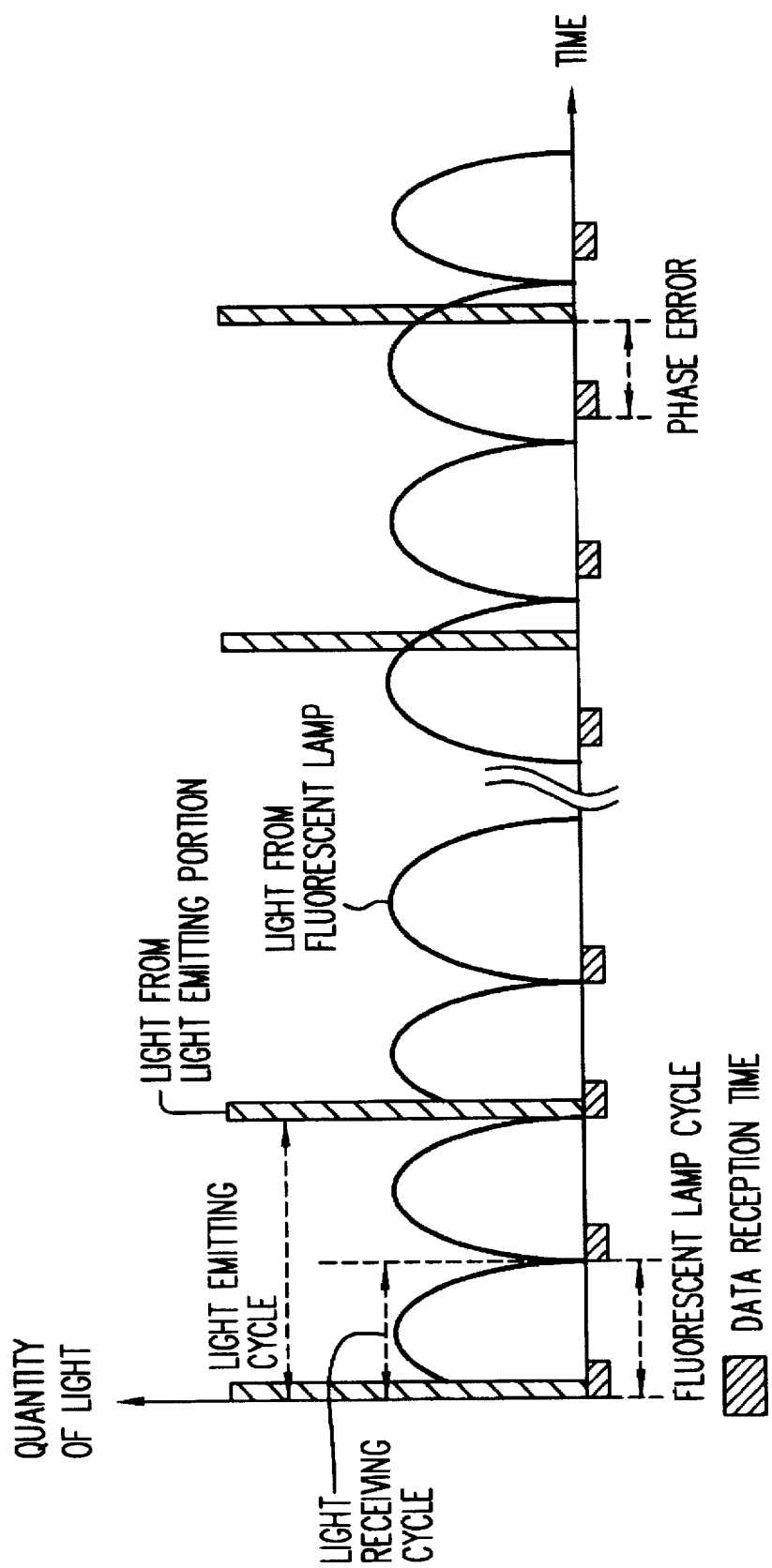
FIG. 14 is a diagram showing an example of a quantity of light emitted from the fluorescent lamp and each of the light emitting portions along a time axis, according to the fourth embodiment of the present invention.

FIG. 14 is a diagram showing the relationship between the quantities of light emitted from a fluorescent lamp and a light emitting portion over time according to the fourth embodiment shown in FIG. 13.

Referring to the figure, the light emitting portion emits light in a light emitting cycle, i.e. period, which is two times that of the fluorescent lamp. As is shown as a light receiving data reception time, light is received in a light receiving cycle as long which is the same as the light emitting cycle of the fluorescent lamp. Thus, the light emitting cycle is an integer multiple of the light receiving cycle. By finding the difference between the quantities of light reception at adjacent data reception times, the quantity of light from only the light emitting portion shown by hatching can be found. At the start of light reception, the light receiving portion of the moving body continues to detect a quantity of light while shifting the phase of the light receiving cycle, and starts synchronization with the light emitting portion at the point where the difference between the quantities of light reception at adjacent data reception times is the largest. As a result, the light emitting portion can be synchronized with the light receiving portion.

However, when light emission and light reception are repeated in response to clocks provided from synchronizing signal generating portion 5 of light emitting unit 1 and synchronizing signal generating portion 31 of light receiving unit 10, after the light emitting portion is synchronized with the light receiving portion, there is a possibility that the phase difference of data reception time may be generated, as shown in the figure. This is because there is a small difference between a multiple of the frequency of the clock provided from synchronizing signal generating portion 5 of light emitting unit 1 and the frequency of the clock provided from synchronizing signal generating portion 31 of light receiving unit 10. As the number of samples increases, the phase error is more accumulated. As a result, the light emitting portion cannot be precisely synchronized with the light receiving portion. Therefore, the light receiving portion again continues detection of a quantity of light while shifting the phase of the light receiving cycle a prescribed time after the start of sampling, and again starts synchronization with the light emitting portion at the point where the quantity of light takes the maximum value. Accordingly, it is possible to carry out precise light emission and light reception.

Figure 29:
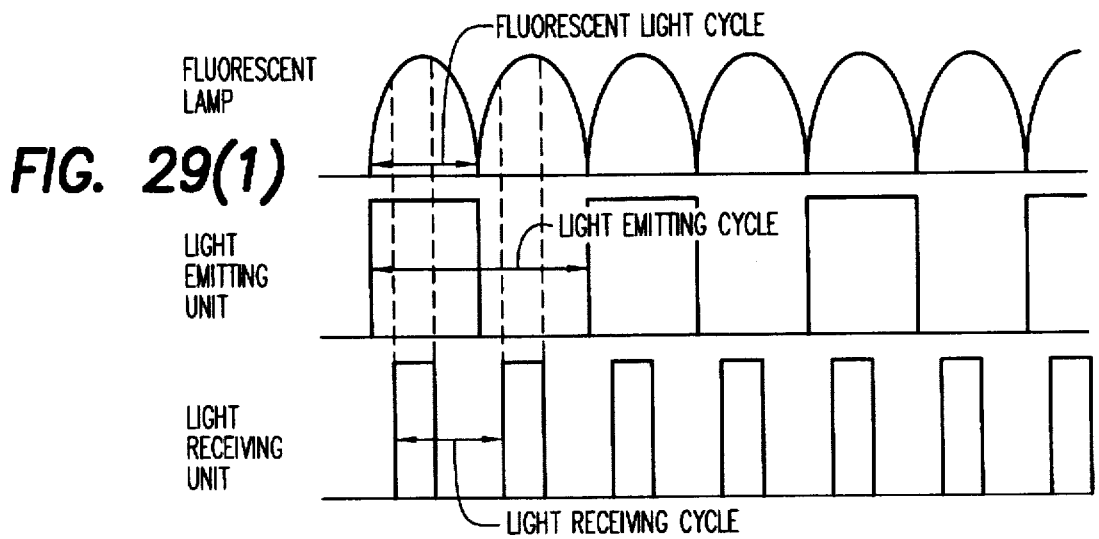
FIG. 29 shows the relationship between the quantity of light and time according to another method of removing the quantity of light of a fluorescent lamp, according to the fourth embodiment of the present invention.
Figure 29:
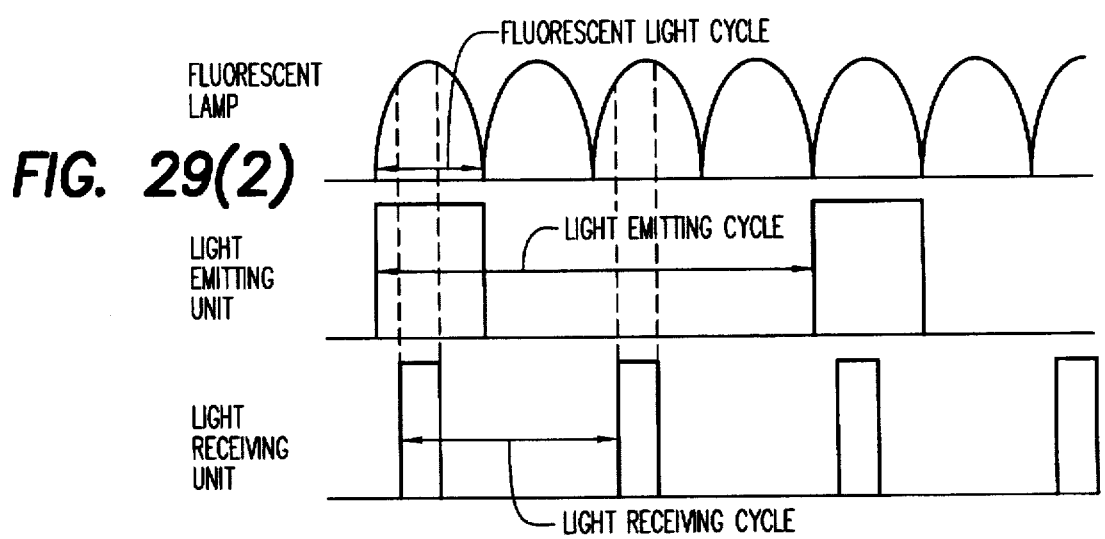
Figure 29:
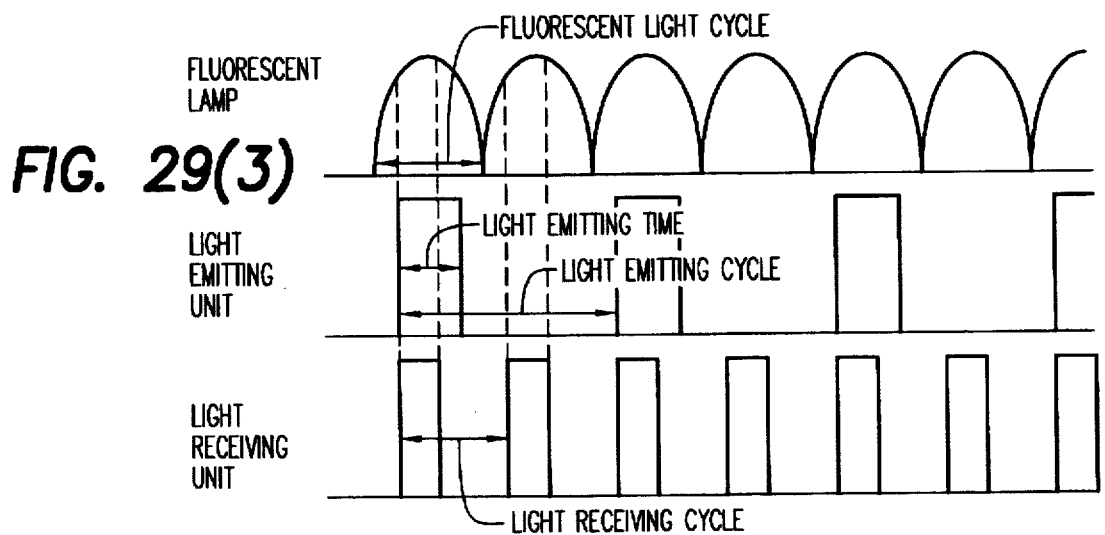

FIG. 29 shows the relationship between the quantity of light and time according to another method of removing the quantity of light of a fluorescent lamp, according to the fourth embodiment of the present invention.

In this method, in order to remove the quantity of fluorescent light, the light emitting cycle of the light emitting unit is basically set to an even multiple of the fluorescent light cycle, and the light receiving cycle of the light receiving unit is basically set to one half the light emitting cycle. In this embodiment, therefore, the fluorescent light cycle is an integer multiple of the light receiving cycle. By controlling respective cycles as described above, the fluorescent lamp emits the same quantity of light when the light emitting unit emits light and when the light emitting unit does not emit light. Therefore, it is determined that the difference between the adjacent quantities of light reception is the quantity of light emitted from the light emitting unit, enabling precise removal of the quantity of fluorescent light.

Figure 22:
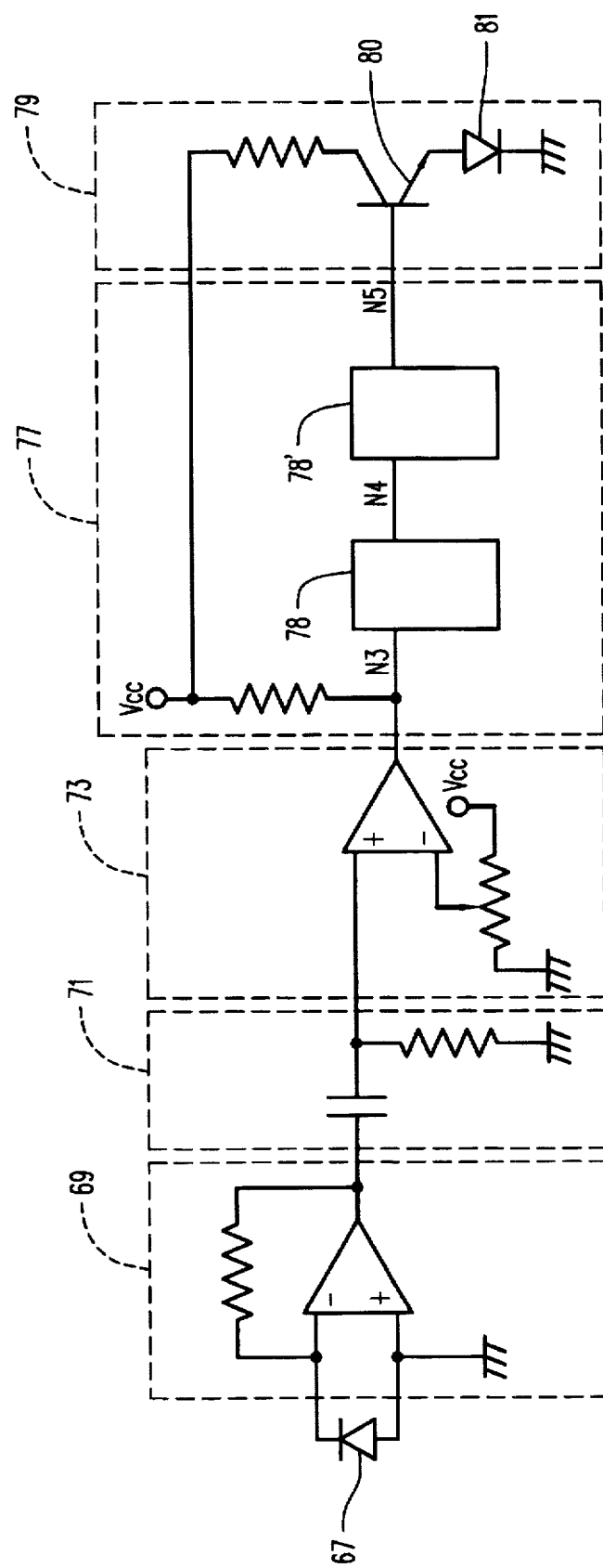
FIG. 22 is a circuit diagram showing a structure of the optical trigger circuit and the light emitting portion according to the fifth embodiment of the present invention.

At (1) of FIG. 29, which shows a basic example of the above method, by using the circuit shown in FIG. 22 as a light emitting unit, the light emitting cycle is set to two times the fluorescent light cycle. On the other hand, by using the circuit shown in FIG. 20 as a light receiving unit, the light receiving cycle is set equal to the fluorescent light cycle.

At (2) of FIG. 29, another example is shown where the light emitting cycle is four times the fluorescent light cycle, and the light receiving cycle is one half the light emitting cycle (two times the fluorescent light cycle).

Shown at (3) of FIG. 29 is a modification of the example shown at (1) of FIG. 29. At (3) of FIG. 29, an example is shown where the light emitting cycle is twice the length of the fluorescent light cycle, and the time during which light is emitted by the light emitting unit is shorter than one fluorescent light cycle. Also in this case, by setting the light receiving cycle one half the light emitting cycle, the quantity of fluorescent light can be removed.

Figure 15:
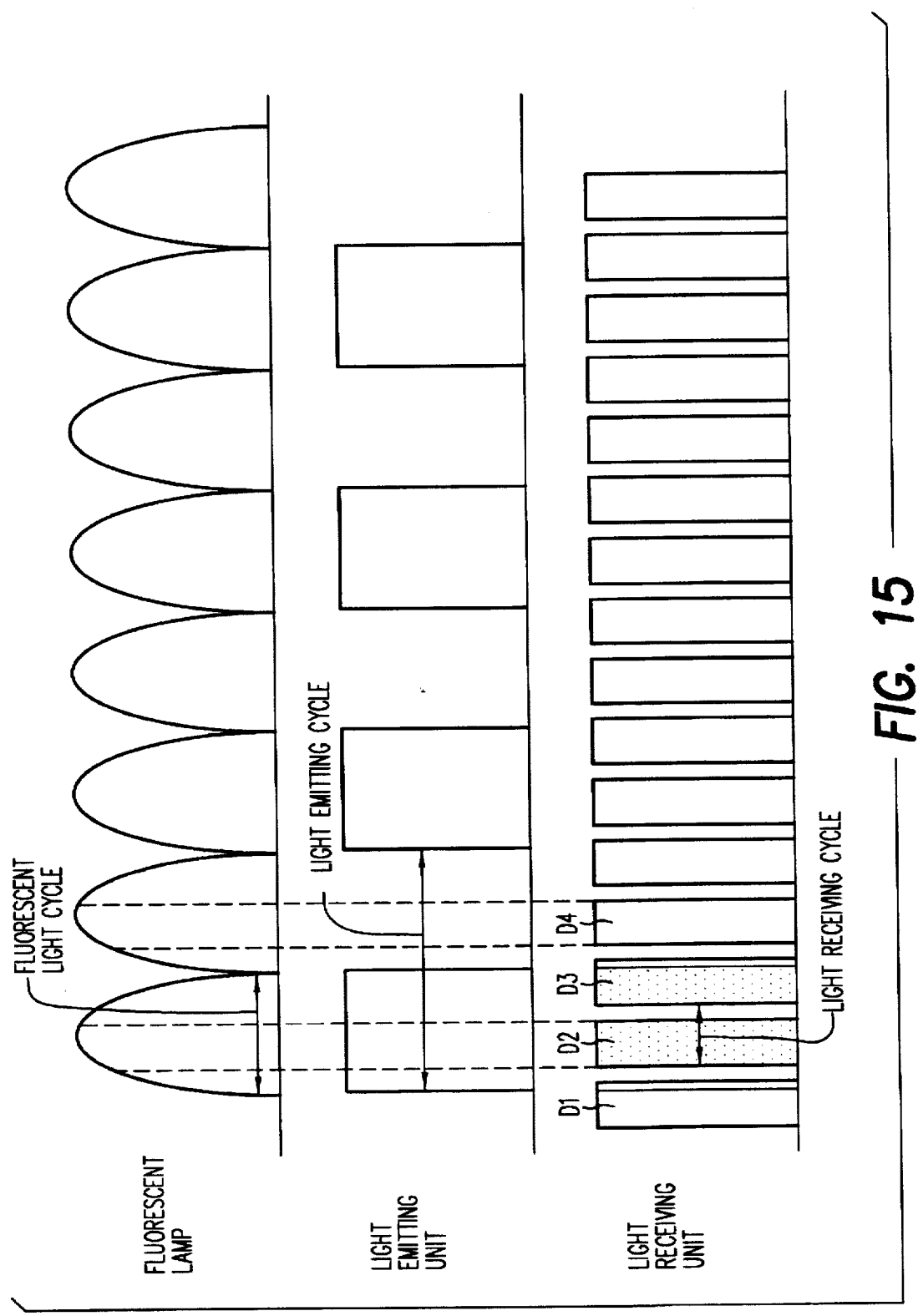
FIG. 15 is a diagram showing another example of a quantity of light emitted from the fluorescent lamp and each of the light emitting portions along a time axis, according to the fourth embodiment of the present invention.

As shown in FIG. 15, the operations cycle of the light emitting unit is twice that of the fluorescent lamp, and the operating cycle of the light receiving unit is one-half that of the fluorescent lamp. In this case, the duty cycle of light emission is set so that light is emitted for ½ cycle and light is not emitted for ½ cycle. When one light emitting pulse is obtained on the light receiving side, |D1−D3| and |D2−D4| are calculated based on the values of the quantities of light reception D1, D2, D3, and D4 at four continuous data reception times. With a larger output as valid data, the quantity of light emitted from the fluorescent lamp is canceled, whereby the quantity of light emitted from only the light emitting unit can be measured. Irrespective of timings of light reception with respect to the light emitting unit, the light receiving unit can always receive precisely either one of the above two absolute value data obtained in the light emitting cycle of one light emitting pulse. Consequently, the same effect can be brought about as the case where the light receiving unit is synchronized with the light emitting unit.

Note that the light emitting unit emits light during a cycle which is twice that of the fluorescent lamp in this embodiment. However, the light emitting unit may emit light not only over a cycle which is twice that of the fluorescent lamp, but also over a cycle which is n times (wherein n is an integer) that of the fluorescent lamp. In this case, the duty cycle of light emission is set so that light is emitted for 1/n cycle, and light is not emitted for (n−1)/n cycle.

Figure 16:
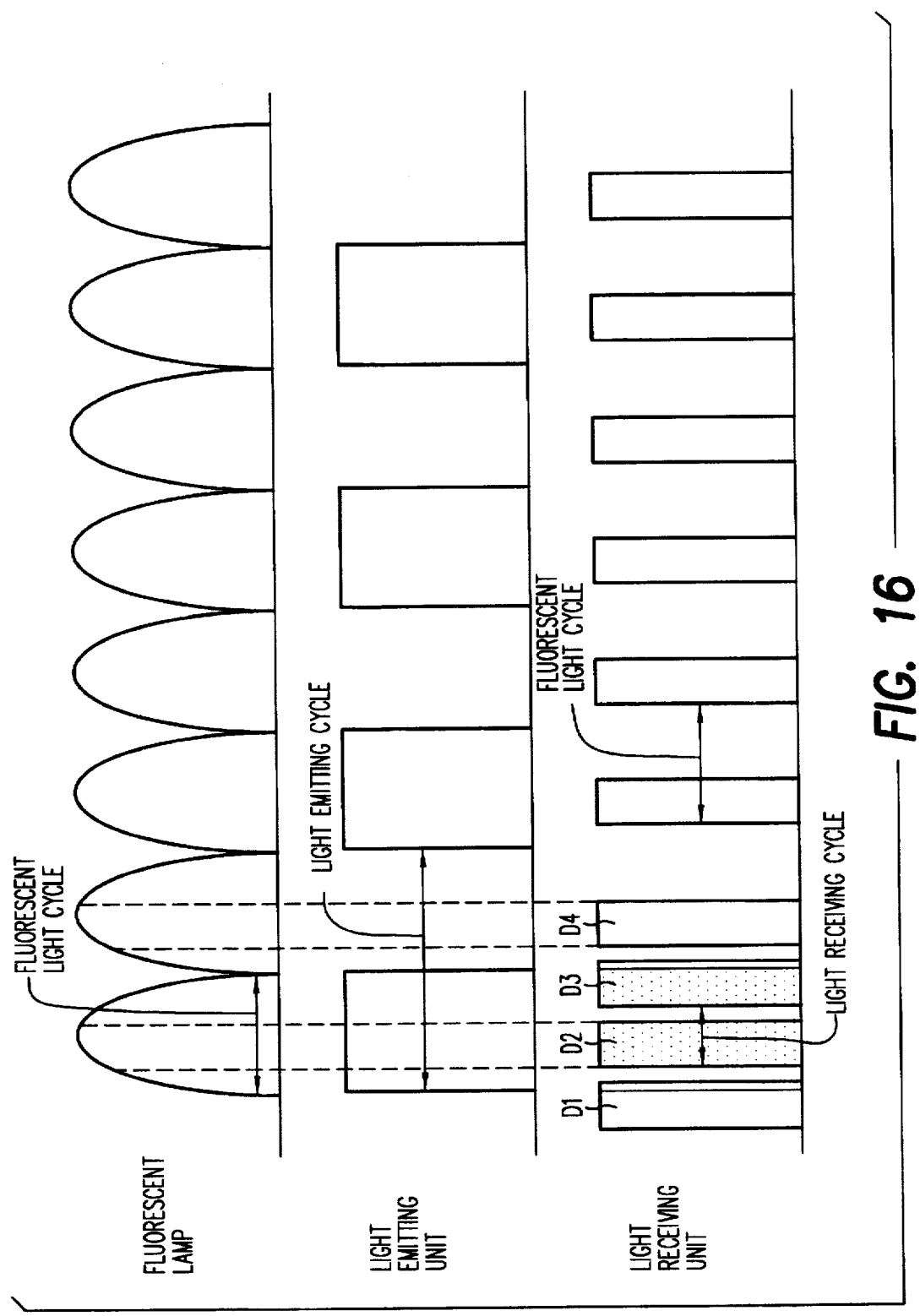
FIG. 16 is a diagram showing still another example of a quantity of light emitted from the fluorescent lamp and each of the light emitting portions along a time axis, according to the fourth embodiment of the present invention.

Further, as shown in FIG. 16, in order to obtain one light emitting signal, the light receiving unit calculates |D1−D3| and |D2−D4| based on the values of the quantities of light reception D1, D2, D3, and D4 at four continuous data reception times. By comparing the calculation results, the light receiving unit recognizes that a larger output is valid data, and determines the valid data reception timing. Then, the light receiving unit increases the light receiving cycle to be equal to the light emitting cycle of the fluorescent lamp. By finding the difference between the quantities of light reception in adjacent light receiving cycles, the same effect can be brought about as the case where the light receiving unit is synchronized with the light emitting unit. However, in this case, there is a small difference between a multiple of the frequency of the clock provided from the synchronizing signal generating portion of the light emitting portion and the frequency of the clock provided from the synchronizing signal generating portion of the light receiving portion. Therefore, as the number of sampling increases, more phase error is accumulated, thereby preventing synchronization between the light emitting unit and the light receiving unit. Therefore, after a prescribed time, the light receiving portion again receives light at a frequency two times that of the fluorescent light, and it is again synchronized with the light emitting portion with a timing, at which accurate data is received, as a valid light receiving timing, whereby transmission and reception of data can be carried out precisely.

The above-described method of removing the quantity of light of the fluorescent lamp can be applied to a system other than the position detecting system of this embodiment. For example, this method can be applied to a system detecting the relative position between a first object having only one light emitting unit and a second object having only one light receiving unit by the light receiving unit receiving light from the light emitting unit, a system, such as a distance measuring system of a camera, for measuring the distance to an object to be photographed by reflecting light emitted from a light emitting unit by the object to be photographed, and receiving the reflected light by a light receiving unit, and the like. Note that, by providing a sensor for sensing a light emitting cycle of a fluorescent lamp as shown in FIG. 13 to these systems, the quantity of light of the fluorescent lamp can be removed more precisely.

Figure 17:
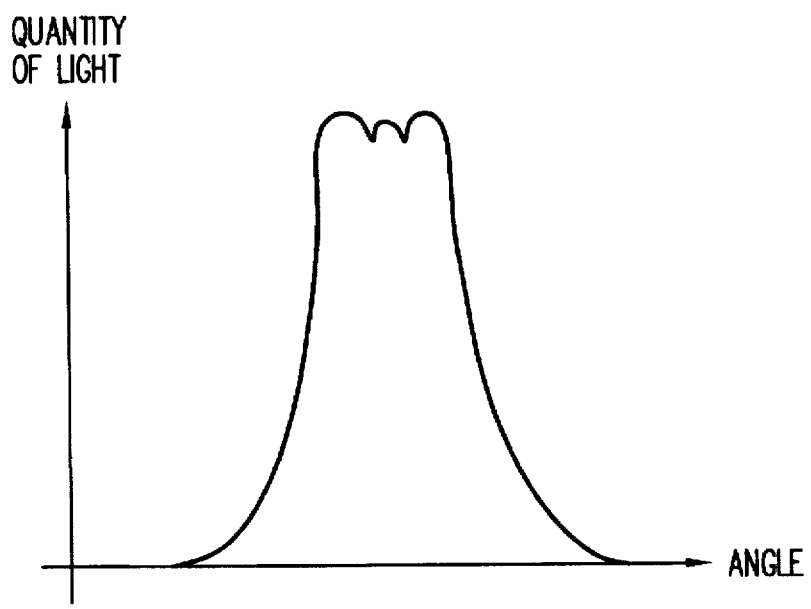
FIG. 17 is a diagram showing characteristics of light receiving data when two light emitting pulses are simultaneously received by a light receiving sensor having a wide directivity, according to the fourth embodiment of the present invention.
Figure 18:
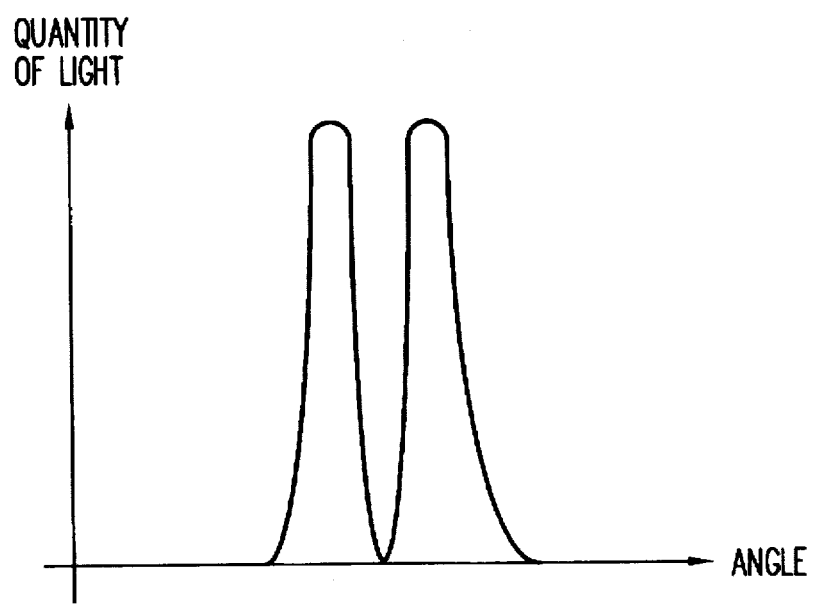
FIG. 18 is a diagram showing characteristics of light receiving data when two light emitting pulses are simultaneously received by a light receiving sensor having a narrow directivity, according to the fourth embodiment of the present invention.
Figure 19:
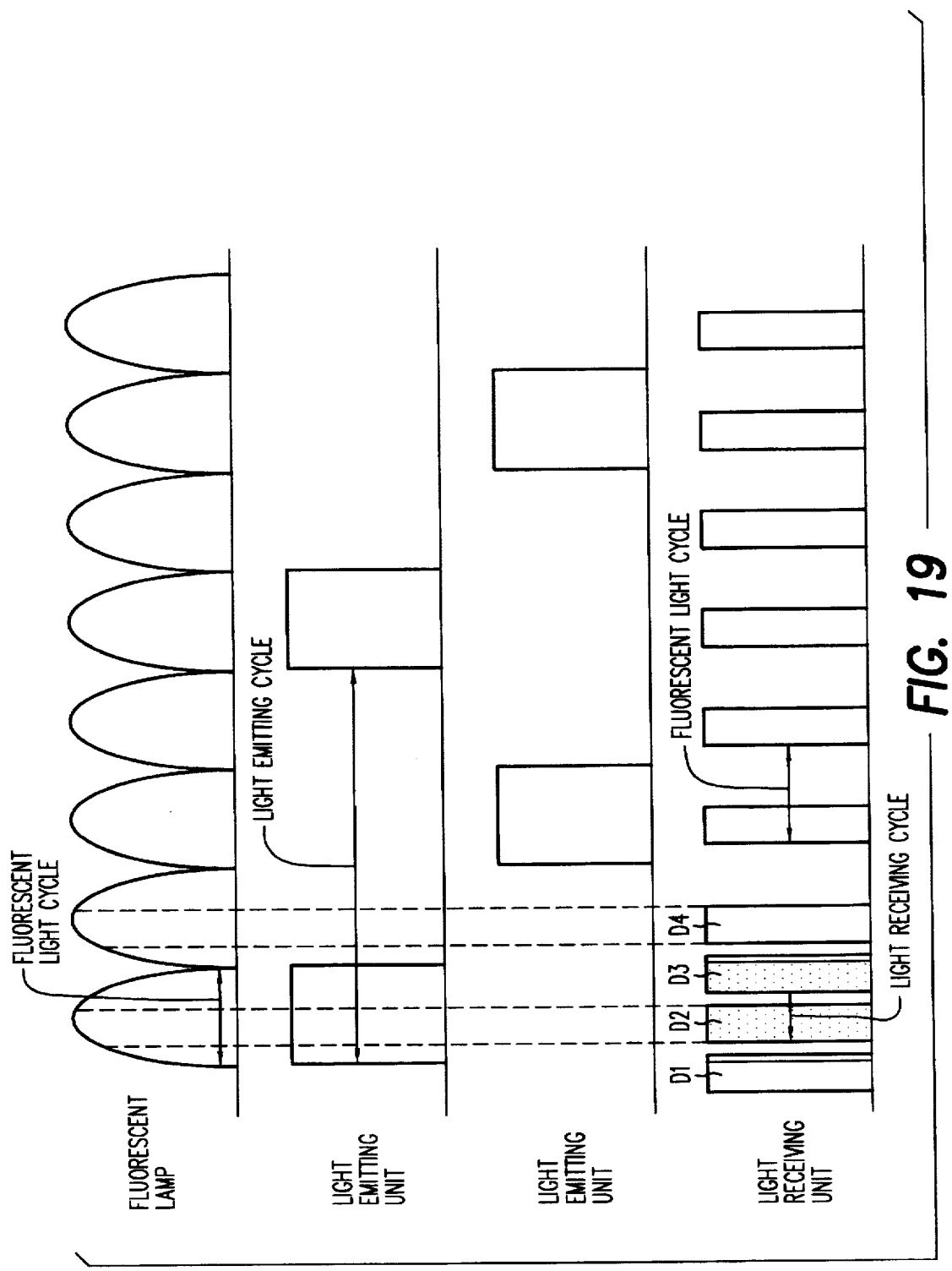
FIG. 19 is a diagram showing a quantity of light emitted from the fluorescent lamp and each of the light emitting portions when the light receiving sensor having a wide directivity shown in FIG. 17 is used.

FIG. 17 shows light receiving data in the case where a sensor having a wide directivity is used as a light receiving sensor on the moving body. FIG. 18 shows light receiving data in the case where a sensor having a narrow directivity is used as a light receiving sensor. When light receiving data of a sensor having a wide directivity is used, the peak of a light receiving signal cannot be determined, resulting in the case where angular data cannot be calculated. Therefore, when a light receiving sensor having a wide directivity is used, two light emitting portions do not emit light simultaneously. Rather, as shown in FIG. 19, two light emitting portions emit light alternately at a frequency ¼ that of the fluorescent light. As a result, the same effect can be brought about as the case where a light receiving sensor having a narrow directivity is used, and the position detection is implemented using an inexpensive light receiving sensor.

Figure 20:
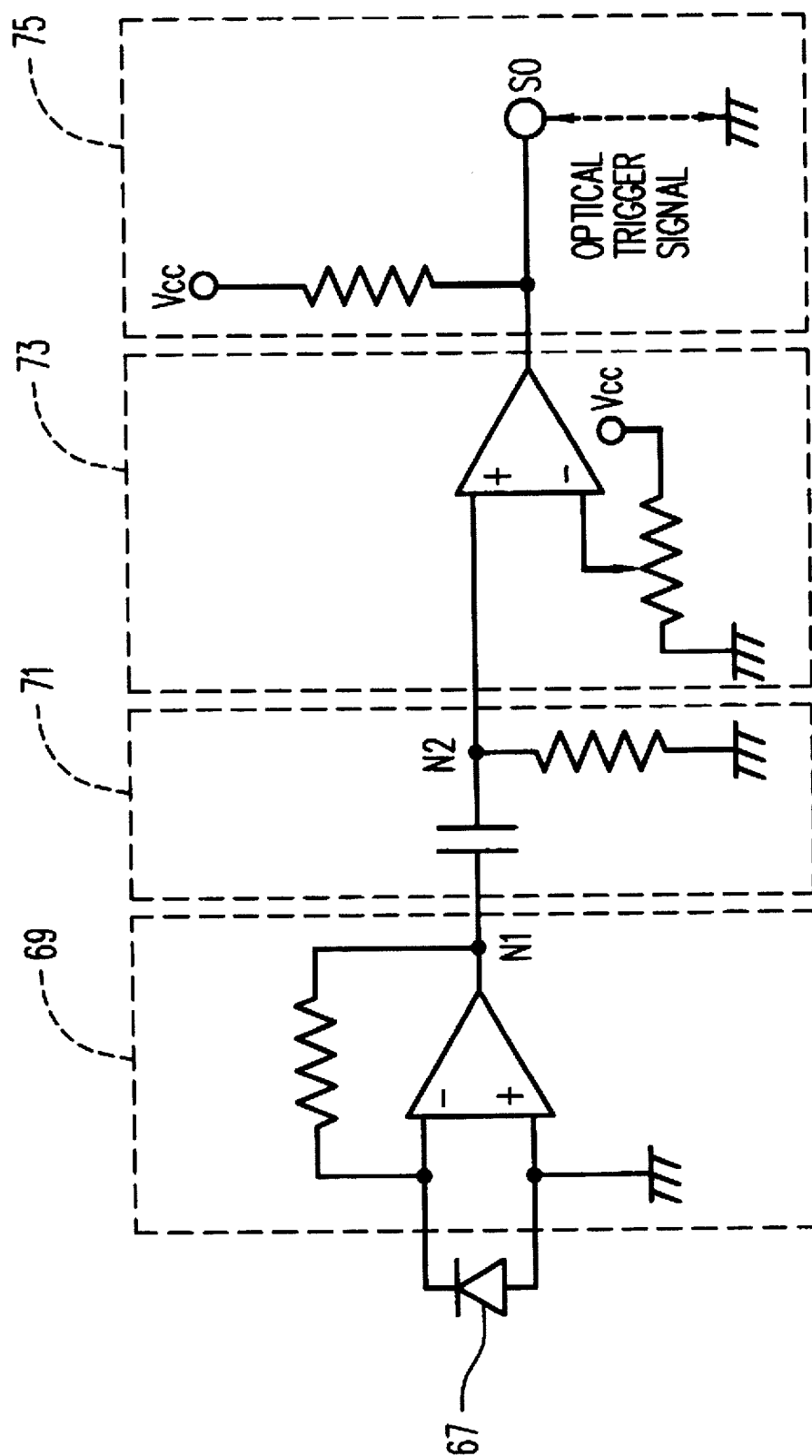
FIG. 20 is a circuit diagram showing a structure of an optical trigger circuit according to a fifth embodiment of the present invention.
Figure 21:
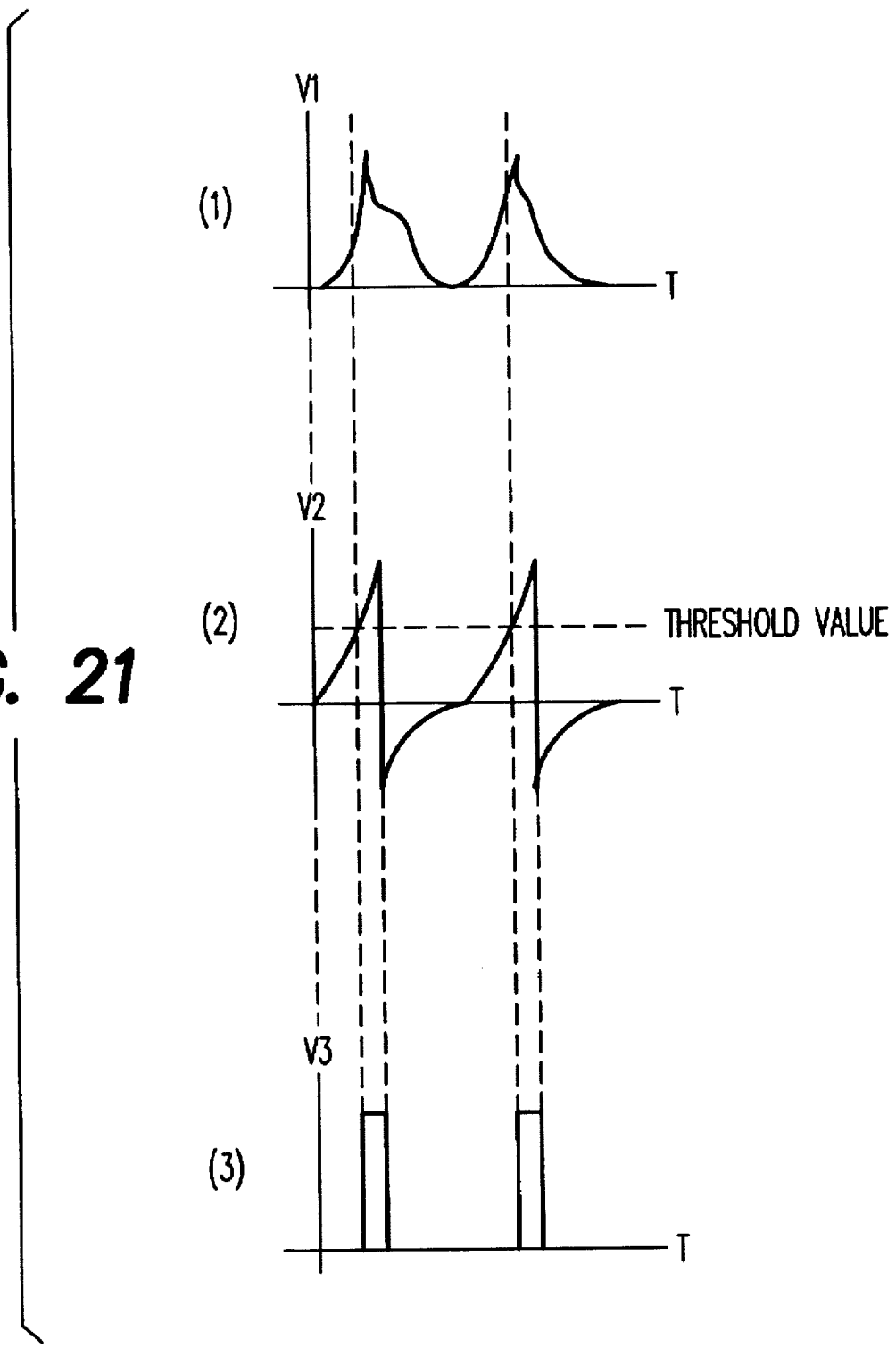
FIG. 21 is a waveform diagram of current or voltage at each node in the circuit diagram of FIG. 20.

FIG. 20 is a circuit diagram of an optical trigger circuit according to the fifth embodiment of the present invention. FIG. 21 is a waveform diagram at each node in the circuit of FIG. 20.

In this embodiment, in addition to light receiving portions for detecting light reception, the light receiving unit includes an optical trigger circuit mainly receiving light of the fluorescent lamp and providing a synchronizing signal. More specifically, the light receiving portion receives light in synchronism with a trigger signal provided from the optical trigger circuit, so that the light receiving portion can be completely synchronized with light emission of the fluorescent lamp.

Referring to FIG. 20, the optical trigger circuit includes a photodiode 67 for receiving light of the fluorescent lamp, an amplifying portion 69 for amplifying a voltage generated by light of the fluorescent lamp entering photodiode 67 with a feedback resistor, a high-pass filter 71 for differentiating the amplified voltage, a comparing portion 73 including a comparator comparing a voltage provided from high-pass filter 71 and a prescribed voltage, and an output portion 75 providing a signal output from comparing portion 73 as an optical trigger signal. Here, FIG. 21 shows a waveform diagram of a voltage value V1 at a node N1 of FIG. 20 at (1), a waveform diagram of a voltage value V2 at a node N2 together with the threshold value at (2), and a pulse signal V3 as an optical trigger signal provided from an output terminal SO of output portion 75 at (3).

By making control so that the light receiving portion receives light in response to an optical trigger signal provided as described above, the light receiving portion can be completely synchronized with light emission of the fluorescent lamp.

Figure 23:
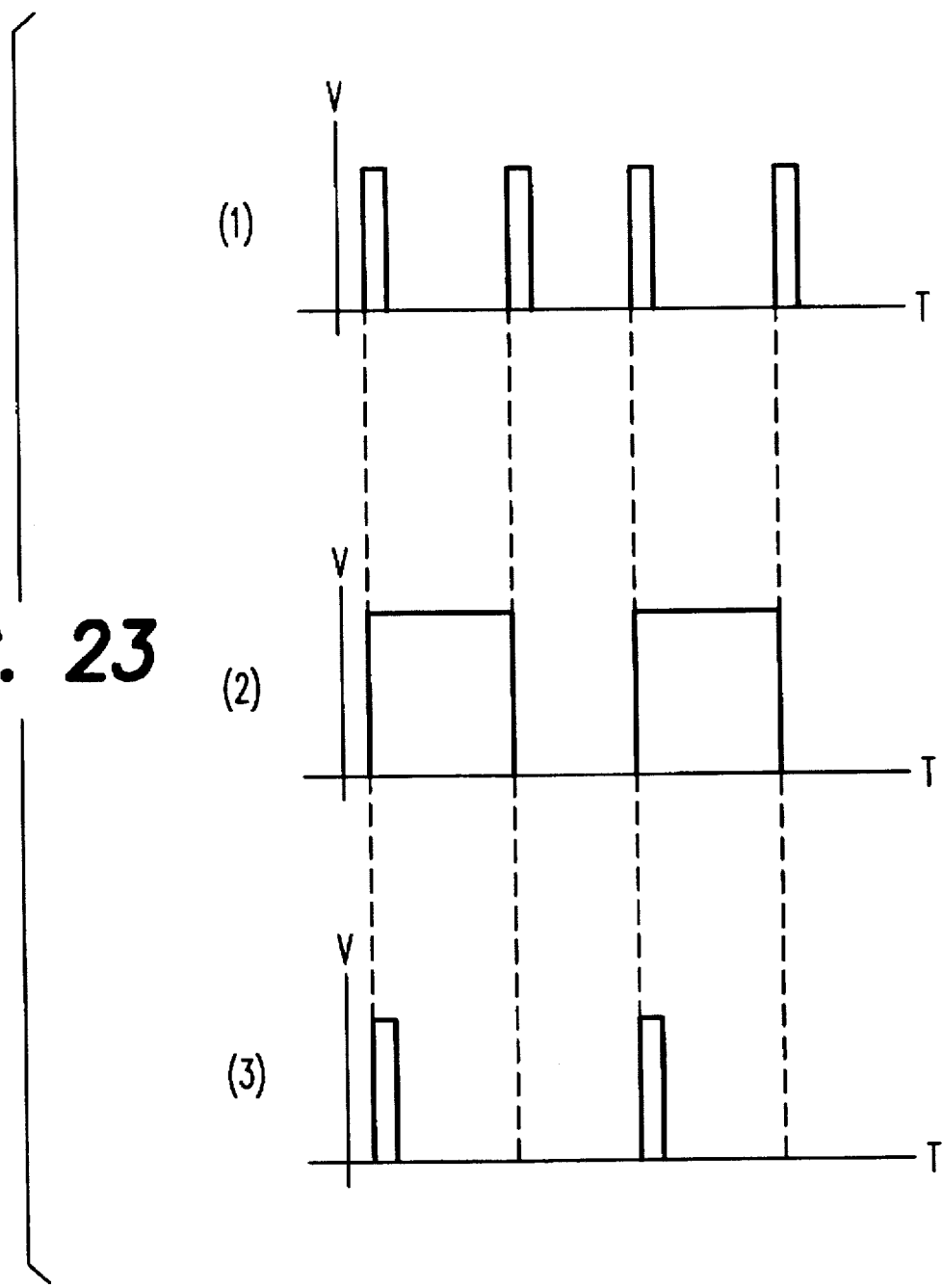
FIG. 23 is a diagram showing a pulse signal at each node in the circuit diagram of FIG. 22.

FIG. 22 is a circuit diagram of an optical trigger circuit provided in the light emitting unit of the station, according to the fifth embodiment of the present invention. FIG. 23 is a waveform diagram of an output signal at nodes $N_3$, $N_4$, and $N_5$ of FIG. 22. In FIG. 22, amplifying portion 69, high-pass filter 71, and comparing portion 73 are structured similar to those of the trigger circuit on the light receiving device side shown in FIG. 20. This optical trigger circuit further includes a light emitting signal output portion 77 including a flip-flop 78 provided on the output side of comparing portion 73, and a monostable multivibrator 78' receiving an output from flip-flop 78, and a light emitting portion 79 including a light emitting diode 81 receiving an output from light emitting signal output portion 77. As shown at (1) of FIG. 23, a pulse signal in synchronism with the light emitting cycle of the fluorescent lamp is provided at node $N_3$. Here, flip-flop 78 counts an input signal and inverts output for every input of one pulse. More specifically, a pulse signal as shown at (2) of FIG. 23 is provided at node $N_4$ on the output side of flip-flop 78, and the signal is applied to monostable multivibrator 78'. As a result, a pulse signal as shown at (3) of FIG. 23 is provided to be applied to a bipolar transistor 80 of light emitting portion 79, causing the transistor to be turned on. As a result, light emitting diode 81 emits light completely in synchronism with a cycle two times that of the fluorescent light. As described above, according to the fifth embodiment, both the light emitting portion and the light receiving portion can emit and receive light completely in synchronism with the light emitting cycle of the fluorescent lamp, resulting in very high precision of calculation of azimuth based on light reception.

Figure 24:
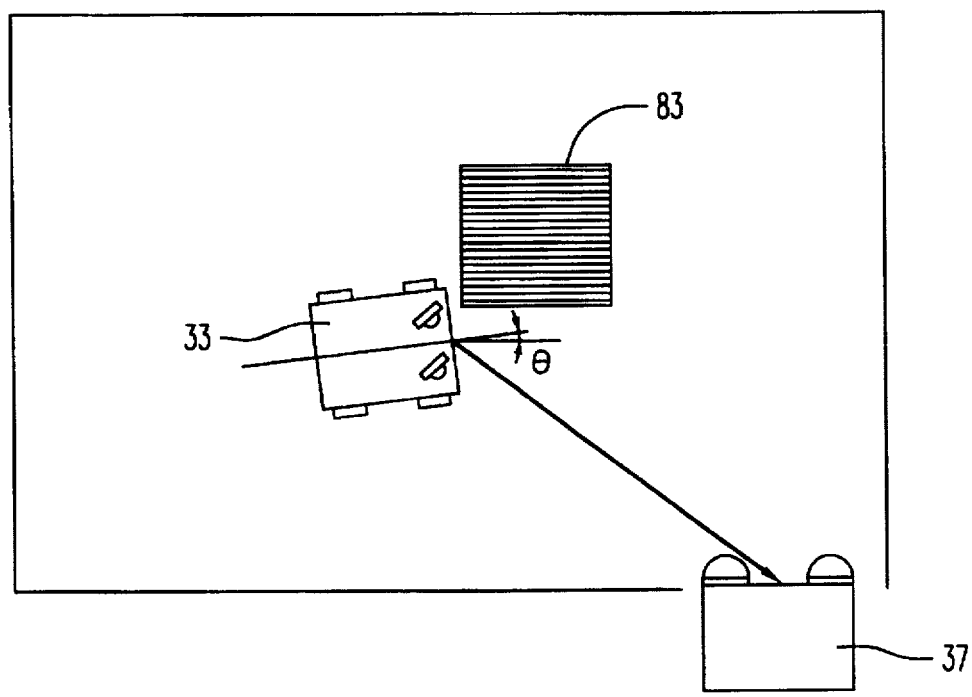
FIG. 24 is a diagram showing an example of the positional relationship between the moving body and the station when the position detecting system according to each embodiment of the present invention is incorporated.

FIG. 24 is a plan view showing the relationship between the moving body in which the position detecting system is incorporated and the station according to the above each embodiment of the present invention.

Referring to the figure, consider the case where moving body 33 whose route is disturbed by an obstacle on the floor or an object 83 which fell on the floor cannot recognize its absolute position. In this case, two light receiving portions having a rotation function of the light receiving unit provided on moving body 33 repeatedly rotate to sample signals from two light emitting portions provided on station 37 serving as a reference station. The light receiving portions calculate the absolute position and the direction (deviation angle, that is, position angle θ) of moving body 33 with respect to station 37 when the light receiving signal takes the maximum value, and provide the calculation results to a drive control portion. As described above, even in an emergency when moving body 33 of the traveling vehicle or robot loses its absolute position, moving body 33 can return to station 37 with safety. Note that the light emitting unit and the light receiving unit may be positioned oppositely. However, the light emitting unit consumes more power than the light receiving unit generally. It is preferable to place the light emitting unit on the side of a larger power supplying ability of a power source.

Figure 25:
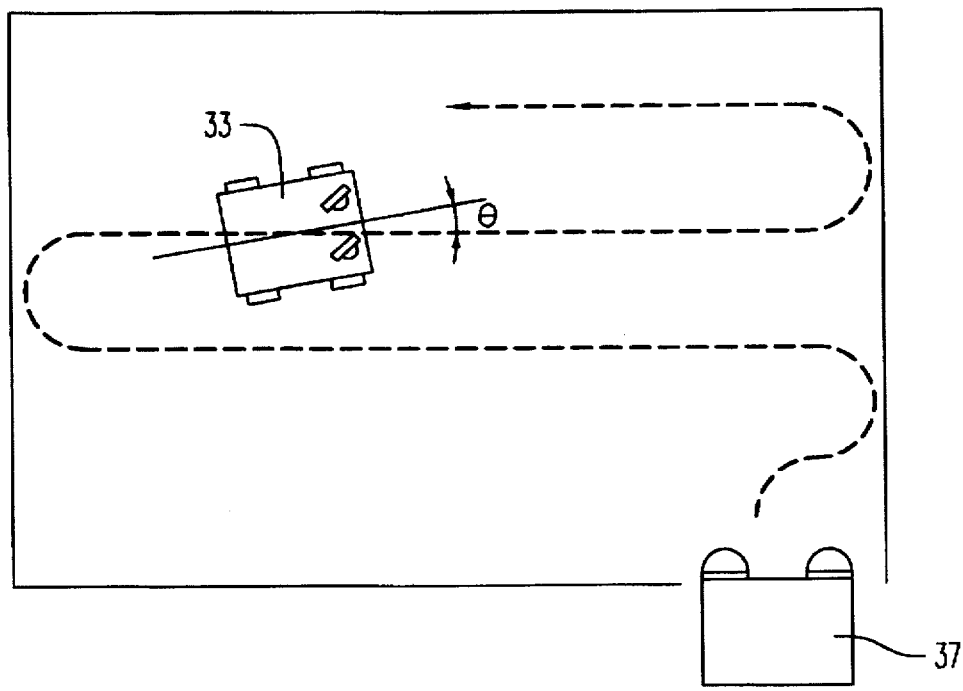
FIG. 25 is a diagram showing another example of the positional relationship between the moving body and the station when the position detecting system according to each embodiment of the present invention is incorporated.

FIG. 25 is a plan view showing a state where the moving body travels by dead reckoning in the relationship between the moving body in which the position detecting system is incorporated and the station according to the above each embodiment of the present invention.

Referring to the figure, consider the case of dead reckoning, that is, the case where moving body 33 estimates and recognizes its own position based on data from an internal sensor (data from an encoder or gyrosensor provided to right and left driving wheels, for example), and travels on the floor. In this case, it is necessary to correct an error of the absolute position by accumulated errors of dead reckoning from a reference traveling route based on map input. In this case, the position detecting system according to the present invention would detect the relative position and the direction of moving body 33 with respect to station 37 serving as a reference station, and calculate the angle and distance to be corrected to the reference traveling route based on the detection results. The position detecting system provides the calculation results to a driving portion, whereby the system can guide moving body 33 to the reference traveling route while correcting the relative position of moving body 33.

Figure 26:
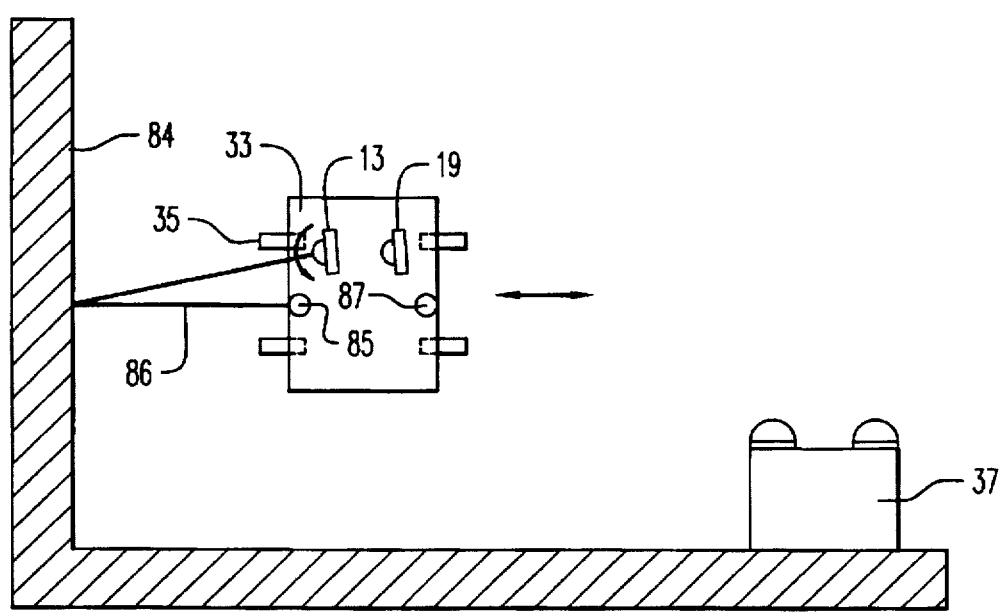
FIG. 26 is a diagram showing an example of control operation of the moving body according to a sixth embodiment of the present invention.

FIG. 26 is a diagram showing an example where light emitting portions and light receiving portions are provided on the moving body itself according to the sixth embodiment of the present invention. By thus structured, the position detecting system has a function of measuring the distance to an obstacle such as a wall, in addition to the above function.

Figure 27:
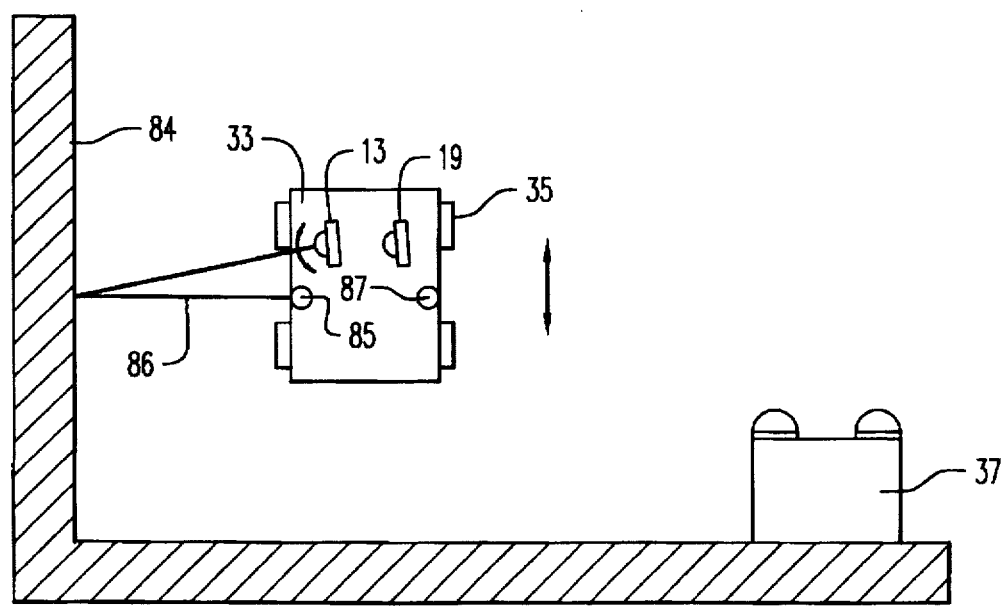
FIG. 27 is a diagram showing another example of control operation of the moving body according to the sixth embodiment of the present invention.

Referring to the figure, assume that moving body 33 approaches a wall 84. On the upper surface of moving body 33, provided are beam light irradiating units 85 and 87, and rotatable light receiving portions 13 and 19. In this case, beam light 86 directed to wall 84 from beam light irradiating unit 85 is diffused and reflected by wall 84, and received by light receiving portion 13. Light receiving portion 13 carries out sampling while rotating, and detects a deviation angle of light receiving portion 13 with respect to a wall face 80 when the light receiving signal takes the maximum value. Based on the detected deviation angle, the distance between moving body 33 and wall 84 is calculated according to the principle of trigonometric distance measurement, and the calculation result is provided to a driving portion 35, whereby the traveling of moving body 33 can be controlled. By using light receiving portions for detecting the position and the direction of the moving body with respect to the station as described above, it is possible to calculate the distance to wall 84. When the moving body travels straight towards the wall as shown in FIG. 26, the moving body can stop to avoid collision, or travel along the wall with a constant distance kept from the wall as shown in FIG. 27, while measuring the distance to the wall.

Figure 28:
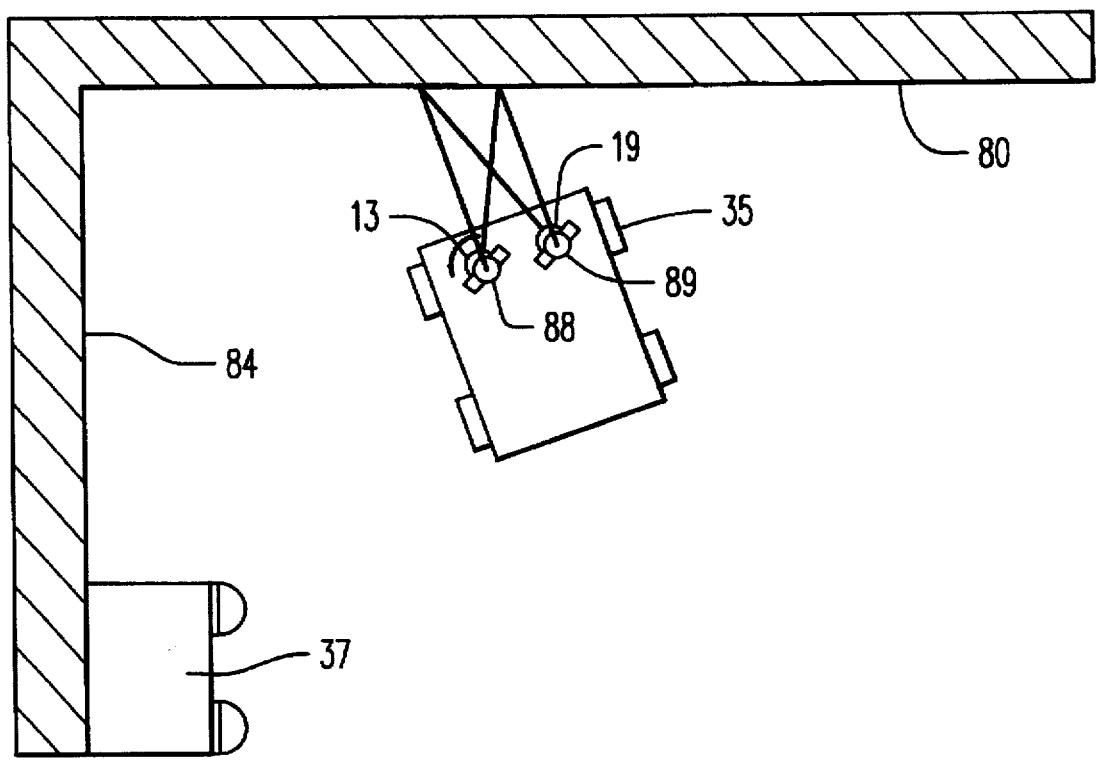
FIG. 28 is a diagram showing an example of control operation of the moving body according to a seventh embodiment of the present invention.

FIG. 28 shows a diagram according to the seventh embodiment of the present invention.

Referring to the figure, assume that moving body 33 travels while approaching wall 84. Beam light irradiating units 88 and 89 are provided on the upper surfaces of rotatable light receiving portions 13 and 19. In this case, beam light emitted from beam light irradiating units 88 and 89 towards wall 84 is diffused and reflected by wall 84, and received by light receiving portions 13 and 19. Light receiving portions 13 and 19 carry out sampling while rotating, and detect deviation angles of light receiving portions 13 and 19 with respect to wall face 80 when the light receiving signals take the maximum value. Based on the detected deviation angles, light receiving portions 13 and 19 calculate the distance and the angle between moving body 33 and wall 84, and provide the calculation results to driving portion 35. Accordingly, the light receiving portions can control the traveling of moving body 33.

In the above embodiments, light is used for transmission and reception between the light emitting unit and the light receiving unit in the above each embodiment. However, transmission and reception can be carried out using a supersonic wave or electromagnetic wave.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A position detecting system for detecting a relative position between a first object and a second object under fluorescent light, comprising:

a light emitter provided on said first object, said light emitter providing emission during one cycle of the fluorescent light, stopping emission, and maintaining a non-emitting condition during at least one following cycle of the fluorescent light;

a light receiver provided on said second object, said light receiver receiving light from said light emitter in a cycle which is related to the fluorescent light cycle such that the fluorescent light cycle is an integer multiple of the light receiving cycle; and a calculator calculating the relative position based on output of said light receiver, wherein the effect of the fluorescent light is removed by operation of said light emitter and said light receiver.

2. A position detecting system as claimed in claim 1, wherein
said calculator calculates a distance and a relative angle between said first object and said second object as the relative position.

3. A position detecting system as claimed in claim 1, wherein
emission of said light emitter is synchronized with the fluorescent light.

4. A position detecting system as claimed in claim 3, wherein
a lag of synchronism between emission of said light emitter and the fluorescent light is corrected after a lapse of a predetermined time.

5. A position detecting system as claimed in claim 1, further comprising
a light receiver detecting the fluorescent light cycle.

6. A position detecting system as claimed in claim 1, wherein
said first object is a moving body which moves on a floor.

7. A position detecting system as claimed in claim 6, wherein
said second object is a station at rest.

8. A position detecting system as claimed in claim 1, wherein said second object is a moving body which moves on a floor.

9. A position detecting system as claimed in claim 8, wherein
said first object is a station at rest.

10. A detecting system operating under cyclic fluorescent light, comprising:
a light emitter which emits light during even multiple cycles of the fluorescent light; and
a light receiver which receives light from said light emitter during a half cycle of a light emitting cycle, wherein
the effect of the fluorescent light is removed by operation of said light emitter and said light receiver.

11. A detecting system operating under fluorescent light, comprising:
a light emitter providing emission during one cycle of the fluorescent light, stopping emission, and maintaining a non-emitting condition during at least one following cycle of the fluorescent light; and
a light receiver receiving light from said light emitter in a cycle which is related to the fluorescent light cycle such at the fluorescent light cycle is an integer multiple of the light receiving cycle; wherein the effect of the fluorescent light is removed by operation of said light emitter and said light receiver.

12. A detecting system as claimed in claimed in claim 11, wherein
emission of said light emitter is synchronized with the fluorescent light.

13. A detecting system as claimed in claim 11, wherein
a lag of synchronism between emission of said light emitter and the fluorescent light is corrected after a lapse of a predetermined time.

14. A detecting system as claimed in claim 11, further comprising
a light receiver detecting the fluorescent light cycle.

15. A position detecting system for detecting a relative position between a first object and a second object under cyclic fluorescent light, comprising:
a light emitter provided on the first object to emit light in a cyclic manner, the light emitter emitting light for a predetermined period during each light emitting cycle of the light emitter, wherein the light emitting cycle is a multiple of a cycle of the fluorescent light;
a light receiver provided on the second object, the light receiver receiving light from the light emitter in a light receiving cycle which is related to the light emitting cycle in a manner such that the light emitting cycle is an integer multiple of the light receiving cycle; and
a calculator calculating the relative position of the first and second objects based on an output of the light receiver, wherein the effect of the fluorescent light is removed by operation of the light emitter and the light receiver.

16. A position detecting system as claimed in claim 15, wherein
said predetermined period is as long as one fluorescent light cycle period.

17. A position detecting system as claimed in claim 15, wherein
said predetermined period is shorter than one fluorescent light cycle period.

18. A position detecting system as claimed in claim 17, wherein
said calculator calculates a distance and a relative angle between said first object and said second object as the relative position.

19. A position detecting system as claimed in claim 17, wherein a lag of synchronism between the emission of light from said light emitter and the cycles of the fluorescent light is corrected after a lapse of a predetermined time.

20. A position detecting system as claimed in claim 17, further comprising
a light receiver detecting the fluorescent light cycle.

21. A position detecting system as claimed in claim 17, wherein
said first object is a moving body which moves on a floor.

22. A position detecting system as claimed in claim 21, wherein
said second object is a station at rest.

23. A position detecting system as claimed in claim 17, wherein said second object is a moving body which moves on a floor.

24. A position detecting system as claimed in claim 23, wherein
said first object is a station at rest.

25. A detecting system operating under cyclic fluorescent light, comprising:
a light emitter emitting light for a predetermined time which is equal to or less than one cycle of the fluorescent light, and maintaining a non-emitting condition during a predetermined time period which is equal to or greater than one cycle of the fluorescent light; and
a light receiver receiving light from the light emitter in a cycle which is related to the light emitting cycle in a manner such that the light emitting cycle is an integer multiple of the light receiving cycle, wherein the effect of the fluorescent light is removed by operation of the light emitter and the light receiver.

26. A detecting system as claimed in claim 25, wherein
a lag of synchronism between the emission of light from said light emitter and the cycles of the fluorescent light is corrected after a lapse of a predetermined time.

27. A detecting system as claimed in claim 25, further comprising
a light receiver detecting the fluorescent light cycle.

* * * * *